US009964185B2

(12) United States Patent
Ogauchi et al.

(10) Patent No.: US 9,964,185 B2
(45) Date of Patent: May 8, 2018

(54) AUTOMATIC TRANSMISSION

(71) Applicant: MAZDA MOTOR CORPORATION, Hiroshima (JP)

(72) Inventors: Yasuhiro Ogauchi, Higashihiroshima (JP); Shinya Kamada, Kure (JP); Tatsuhiko Iwasaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 66 days.

(21) Appl. No.: 15/033,798

(22) PCT Filed: Nov. 5, 2014

(86) PCT No.: PCT/JP2014/005550
§ 371 (c)(1),
(2) Date: May 2, 2016

(87) PCT Pub. No.: WO2015/075878
PCT Pub. Date: May 28, 2015

(65) Prior Publication Data
US 2016/0281823 A1    Sep. 29, 2016

(30) Foreign Application Priority Data

Nov. 25, 2013 (JP) .................. 2013-242689

(51) Int. Cl.
*F16H 3/66* (2006.01)
*F16H 3/44* (2006.01)

(52) U.S. Cl.
CPC .......... *F16H 3/66* (2013.01); *F16H 2003/442* (2013.01); *F16H 2200/006* (2013.01);
(Continued)

(58) Field of Classification Search
CPC ................................. F16H 2200/442
See application file for complete search history.

(56) References Cited

U.S. PATENT DOCUMENTS 4,711,138 A    12/1987    Miura et al.
7,803,082 B2 *  9/2010   Diosi ............... F16H 3/66
                                                475/275
(Continued)

FOREIGN PATENT DOCUMENTS

CN    101550998 A    10/2009
JP    49-117869 A    11/1974
(Continued)

OTHER PUBLICATIONS

International Search Report and Written Opinion issued in Application No. PCT/JP2014/005550, dated Feb. 3, 2015.
(Continued)

*Primary Examiner* — Sherry L Estremsky
(74) *Attorney, Agent, or Firm* — Studebaker & Brackett PC

(57) ABSTRACT

Disclosed is an automatic transmission (10) in which, of four planetary gear sets (PG1, PG2, PG3, and PG4), two planetary gear sets (PG2, PG3) are arranged such that one of the two planetary gear sets (PG2, PG3) is disposed radially inward from the other to form a two-stage planetary gear set (PGt). One planetary gear set (PG1) of the other two planetary gear sets functions as a specified planetary gear set disposed adjacent to the two-stage planetary gear set in a transmission axial direction. A carrier (C3) of the radially outer planetary gear set (PG3) of the two-stage planetary gear set, a carrier (C1) of the specified planetary gear set, and an output section (an output gear (13)) are always engaged together.

17 Claims, 17 Drawing Sheets

(52) U.S. Cl.
CPC ............... *F16H 2200/2012* (2013.01); *F16H 2200/2015* (2013.01); *F16H 2200/2043* (2013.01)

(56) References Cited

U.S. PATENT DOCUMENTS

| | | | |
|---|---|---|---|
| 8,133,148 B2* | 3/2012 | Wittkopp | F16H 3/66 475/275 |
| 8,678,973 B2* | 3/2014 | Iizuka | F16H 3/62 475/287 |
| 2004/0048716 A1 | 3/2004 | Ziemer | |
| 2006/0025276 A1 | 2/2006 | Shim | |
| 2008/0153653 A1 | 6/2008 | Diosi et al. | |
| 2009/0247343 A1 | 10/2009 | Hart et al. | |
| 2015/0011352 A1 | 1/2015 | Beck et al. | |
| 2015/0300490 A1* | 10/2015 | Iwasaki | F16H 63/3026 475/146 |
| 2016/0017961 A1* | 1/2016 | Beck | F16H 3/666 475/277 |
| 2016/0017962 A1* | 1/2016 | Beck | F16H 3/66 475/275 |

FOREIGN PATENT DOCUMENTS

| | | |
|---|---|---|
| JP | 62-141344 A | 6/1987 |
| JP | H04-015338 A | 1/1992 |
| JP | 2004-529297 A | 9/2004 |
| JP | 2008-534865 A | 8/2008 |
| KR | 100736782 B1 | 7/2007 |
| WO | 2013/117369 A1 | 8/2013 |

OTHER PUBLICATIONS

Notification of Transmittal of Translation of the International Preliminary Report on Patentability; PCT/JP2014/005550 dated May 26, 2016.

* cited by examiner

FIG.3

|  | CL1 | CL2 | CL3 | BR1 | BR2 |
|---|---|---|---|---|---|
| FIRST GEAR | ○ |  |  | ○ | ○ |
| SECOND GEAR |  | ○ |  | ○ | ○ |
| THIRD GEAR | ○ | ○ |  |  | ○ |
| FOURTH GEAR |  | ○ | ○ |  | ○ |
| FIFTH GEAR | ○ |  | ○ |  | ○ |
| SIXTH GEAR | ○ | ○ | ○ |  |  |
| SEVENTH GEAR | ○ |  | ○ | ○ |  |
| EIGHTH GEAR |  | ○ | ○ | ○ |  |
| REVERSE GEAR |  |  | ○ | ○ | ○ |

<FIRST GEAR>

<FIRST GEAR>

○――○ ALWAYS ENGAGED
×------× ENGAGED BY CLUTCH
■ FIXED BY BRAKE
● INPUT AND OUTPUT ROTATION

<SECOND GEAR>

<SECOND GEAR>

○——○ ALWAYS ENGAGED
×------× ENGAGED BY CLUTCH
■ FIXED BY BRAKE
● INPUT AND OUTPUT ROTATION

<THIRD GEAR>

<THIRD GEAR>

○———○ ALWAYS ENGAGED
×------× ENGAGED BY CLUTCH
■ FIXED BY BRAKE
● INPUT AND OUTPUT ROTATION

<FOURTH GEAR>

<FOURTH GEAR>

○——○ ALWAYS ENGAGED
✕------✕ ENGAGED BY CLUTCH
■ FIXED BY BRAKE
● INPUT AND OUTPUT ROTATION

<FIFTH GEAR>

<FIFTH GEAR>

○——○ ALWAYS ENGAGED
×------× ENGAGED BY CLUTCH
■ FIXED BY BRAKE
● INPUT AND OUTPUT ROTATION

<SIXTH GEAR>

<SIXTH GEAR>

○——○ ALWAYS ENGAGED
×······× ENGAGED BY CLUTCH
■ FIXED BY BRAKE
● INPUT AND OUTPUT ROTATION

<SEVENTH GEAR>

<SEVENTH GEAR>

○——○ ALWAYS ENGAGED
×------× ENGAGED BY CLUTCH
■ FIXED BY BRAKE
● INPUT AND OUTPUT ROTATION

<EIGHTH GEAR>

<EIGHTH GEAR>

○——○ ALWAYS ENGAGED
×------× ENGAGED BY CLUTCH
■ FIXED BY BRAKE
● INPUT AND OUTPUT ROTATION

<REVERSE GEAR>

<REVERSE GEAR>

○──○ ALWAYS ENGAGED
✕┄┄✕ ENGAGED BY CLUTCH
■ FIXED BY BRAKE
● INPUT AND OUTPUT ROTATION

FIG.13

|  | SUN GEAR | RING GEAR | PINION |
|---|---|---|---|
| PG1 | 40 | 108 | 34 |
| PG2 | 58 | 108 | 25 |
| PG3 | 52 | 86 | 17 |
| PG4 | 42 | 108 | 31 |

FIG.14

|  | GEAR REDUCTION RATIO | GEAR STEP |
|---|---|---|
| FIRST GEAR | 4.894 |  |
|  |  | 1.537 |
| SECOND GEAR | 3.184 |  |
|  |  | 1.511 |
| THIRD GEAR | 2.107 |  |
|  |  | 1.255 |
| FOURTH GEAR | 1.679 |  |
|  |  | 1.301 |
| FIFTH GEAR | 1.290 |  |
|  |  | 1.290 |
| SIXTH GEAR | 1.000 |  |
|  |  | 1.202 |
| SEVENTH GEAR | 0.832 |  |
|  |  | 1.278 |
| EIGHTH GEAR | 0.651 |  |
| REVERSE GEAR | −3.540 |  |

AUTOMATIC TRANSMISSION

TECHNICAL FIELD

The present invention belongs to a technical field relating to an automatic transmission mounted in a vehicle.

BACKGROUND ART

In general, an automatic transmission mounted in a vehicle includes a plurality of planetary gear sets (planetary gear mechanisms) and a plurality of hydraulic frictional engagement elements such as clutches and brakes, and is configured to provide a plurality of forward gear and usually one reverse gear by selectively engaging these frictional engagement elements by hydraulic control, and thereby switching power transmission paths through the planetary gear sets.

Recently, there have been a growing demand for increasing the number of forward gears in order to improve engine fuel consumption performance or transmission performance. For example, an automatic transmission has been proposed which includes three planetary gear sets and six frictional engagement elements, and provides eight forward gears by engaging two of the frictional engagement elements in combination.

Unfortunately, in this configuration of the automatic transmission, there are four frictional engagement elements that are disengaged in each gear. Therefore, sliding resistance between friction plates of frictional engagement elements that are disengaged, viscous resistance of lubricant oil between the friction plates, or other factors may increase driving loss in the overall automatic transmission, resulting in a deterioration of improvement effect of fuel consumption performance by multiple gears.

Patent Document 1 discloses, as illustrated in FIG. 18, an automatic transmission including four planetary gear sets PGa, PGb, PGc, and PGd, and five frictional engagement elements, namely, first, second, and third clutches CLa, CLb, and CLc, and first and second brakes BRa and BRb, and producing eight forward gears by selectively engaging three of the five frictional engagement elements. According to this transmission, the number of frictional engagement elements that are disengaged is two in each gear. This reduces the driving loss as described above.

In the automatic transmission disclosed in Patent Document 1, of the four planetary gear sets PGa, PGb, PGc, and PGd, the two planetary gear sets PGa and PGb are disposed closer to an input side such that one of the two planetary gear sets PGa and PGb is disposed radially inward from the other. This reduces the length of the automatic transmission in the axial direction.

CITATION LIST

Patent Document

PATENT DOCUMENT 1: International Patent Publication WO2013/117369

SUMMARY OF THE INVENTION

Technical Problem

If two planetary gear sets are arranged such that one of the two planetary gear sets is disposed radially inward from the other, a carrier X of the radially outer planetary gear set PGb of the two planetary gear sets rotatably supports a pinion of the radially outer planetary gear set PGb, as illustrated in FIG. 18. This pinion is disposed radially outward from a sun gear Y integrated with a ring gear of the radially inner planetary gear set PGa, and accordingly, the diameter of the carrier X is larger than those of the carriers of the other planetary gear sets (in particular, the radially inner planetary gear set PGa).

As a result, the support for the carrier X (and the pinion supported by the carrier X) of the radially outer planetary gear set PGb becomes unstable, and accordingly, the support for a ring gear with a larger diameter disposed radially outward from the pinion also becomes unstable. Consequently, the rotation axes of the carrier X, the pinion, and the ring gear radially outward from the pinion tend to be tilted with respect to the axial direction of the automatic transmission without extending in that direction. If the radially outer planetary gear set PGb is driven in such a tilted state, gear mesh failure is caused in the radially outer planetary gear set PGb. This may cause, e.g., gear noise and a decrease in durability of the gears, which are problems.

In view of the foregoing background, it is therefore an object of the present invention to provide an automatic transmission having a new configuration that allows for, even if a two-stage planetary gear set is formed by arranging two planetary gear sets such that one of the two planetary gear sets is disposed radially inward from the other to reduce the axial length of the automatic transmission, stably supporting a carrier, pinion, and ring gear of the radially outer planetary gear set of the two-stage planetary gear set.

Solution to the Problem

To achieve the above object, the present invention is directed to an automatic transmission mounted in a vehicle. The automatic transmission includes: in a transmission case, an input section coupled to a drive source; an output section; four planetary gear sets forming a plurality of power transmission paths from the input section to the output section; and five frictional engagement elements configured to select one of the plurality of the power transmission paths to switch among the power transmission paths, the input section, the output section, the planetary gear sets, and the five frictional engagement elements being coaxially arranged. Two of the four planetary gear sets are arranged such that one of the two planetary gear sets is disposed radially inward from the other to form a two-stage planetary gear set. One of the other two planetary gear sets functions as a specified planetary gear set disposed adjacent to the two-stage planetary gear set in an axial direction of the automatic transmission. A carrier of a radially outer planetary gear set of the two-stage planetary gear set, a carrier of the specified planetary gear set, and the output section are always engaged together.

In this configuration, two of four planetary gear sets are arranged such that one of the two planetary gear sets is disposed radially inward from the other to form a two-stage planetary gear set. This reduces the axial length of the automatic transmission. Also, a carrier of the radially outer planetary gear set of the two-stage planetary gear set, a carrier of the specified planetary gear set disposed adjacent to the two-stage planetary gear set in the axial direction, and an output section are always engaged together. Thus, the two carriers and the output section are engaged together in the axial direction to form a cylindrical structure.

The length of this cylindrical structure in the axial direction (coinciding with an axial direction of the cylindrical structure) is of course longer than the length of each element of this cylindrical structure in the axial direction. Thus, it becomes difficult to allow the axial direction of the overall cylindrical structure to be tilted with respect to the axial direction of the automatic transmission. As a result, this allows stable support for the carrier (and the pinion supported by this carrier) of the radially outer planetary gear set. This allows stable support for the ring gear disposed radially outward from the pinion. Consequently, good gear mesh is maintained in the radially outer planetary gear set of the two-stage planetary gear set, and gear noise and a decrease in durability of the gears, caused by gear mesh failure, are reduced, for example.

In the automatic transmission, it is preferable that, in the two-stage planetary gear set, a ring gear of a radially inner planetary gear set and a sun gear of the radially outer planetary gear set be integrated together.

In the two-stage planetary gear set, a ring gear of a radially inner planetary gear set and a sun gear of the radially outer planetary gear set are integrated together. As a result, compared to a configuration where these elements are separately formed and engaged together by a coupling member, the number of the elements may be reduced, and the outer diameter of the sun gear of the radially outer planetary gear set may also be reduced. This may also reduce the outer diameter of the two-stage planetary gear set (the outer diameter of the ring gear of the radially outer planetary gear set).

Embodiments of integration of the ring gear and the sun gear include an embodiment in which teeth of the ring gear and teeth of the sun gear are respectively formed on the inner peripheral and outer peripheral surfaces of one annular component, and an embodiment in which the outer peripheral surface of the ring gear is fitted to the inner peripheral surface of the sun gear to integrate them together by, e.g., welding or shrinkage fit.

In one embodiment of the automatic transmission, the five frictional engagement elements includes three clutches each having a radially inner rotating member and a radially outer rotating member, and each engaging and disengaging the associated radially inner rotating member with and from the associated radially outer rotating member in accordance with supply and release of a hydraulic pressure, and the radially outer rotating members of the three clutches are integrated together to function as a radially outer common rotating member shared by the three clutches.

Therefore, power transmitting members engaged with the radially inner rotating members of the clutches are disposed radially inwardly of the radially outer common rotating member. This may prevent the radially outer side of the radially outer common rotating member from being covered with the power transmitting members or other elements, and allows the radially outer side of the radially outer common rotating member to directly face the inner surface of the transmission case.

As a result, hydraulic pressure supply passages through which the respective clutches are supplied with a hydraulic pressure from the transmission case may directly communicate with the respective clutches from the transmission case without passing through an oil passage provided in an element other than the elements forming the clutches. Here, in a second clutch CLb of a conventional automatic transmission shown in, e.g., FIG. 18, both sides of the second clutch CLb in the transmission axial direction and the radially outer side of the second clutch CLb is covered with planetary gear sets and a power transmission element. Therefore, a hydraulic pressure is supplied to the second clutch CLb through an oil passage passing through the radially inner side of the planetary gear set, such as an oil passage passing through the radially inner side of the planetary gear set and provided in, e.g., a shaft member or a sleeve member. On the other hand, the configuration in which the respective clutches are not covered with an element other than the elements forming the clutches may allow the hydraulic pressure supply passages from the transmission case to the respective clutches to directly communicate with the respective clutches through the radially outer common rotating member from the transmission case. This may simplify the hydraulic pressure supply passages. Consequently, this may further reduce the size of the automatic transmission, and accelerates supplying/releasing a hydraulic pressure to improve responsiveness of transmission control.

In the case where the above-described radially outer common rotating member is provided, the three clutches may be arranged in the transmission case adjacent to an end wall portion provided at an axial end portion of the transmission case such that one of the clutches is disposed inwardly from an other of the clutches in a radial direction perpendicular to the axial direction, and the other of the clutches is disposed inwardly from still an other of the clutches in the radial direction. Hydraulic pressure supply passages from the transmission case to the respective clutches may be provided so as to communicate with hydraulic pressure chambers of the respective clutches from the end wall portion of the transmission case through the radially outer common rotating member.

Also, in the case where the above-described radially outer common rotating member is provided, the transmission case may include an intermediate wall portion provided at an intermediate position in the axial direction and extending in a radial direction perpendicular to the axial direction. The three clutches may be arranged in the transmission case adjacent to the intermediate wall portion such that one of the clutches is disposed inwardly from an other of the clutches in a radial direction perpendicular to the axial direction, and the other of the clutches is disposed inwardly from still an other of the clutches in the radial direction. Hydraulic pressure supply passages from the transmission case to the respective clutches may be provided so as to communicate with hydraulic pressure chambers of the respective clutches from the intermediate wall portion of the transmission case through the radially outer common rotating member.

Such configurations allow the hydraulic pressure supply passages from the transmission case to the respective clutches to be densely disposed in the end wall portion or the intermediate wall portion of the transmission case to implement simplification of the hydraulic pressure supply passages.

In the automatic transmission, the following configuration is preferable. The four planetary gear sets are first, second, third, and fourth planetary gear sets all of which are of a single-pinion type. The first planetary gear set includes a first sun gear, a first carrier, and a first ring gear. The second planetary gear set includes a second sun gear, a second carrier, and a second ring gear. The third planetary gear set includes a third sun gear, a third carrier, and a third ring gear. The fourth planetary gear set includes a fourth sun gear, a fourth carrier, and a fourth ring gear. The radially inner planetary gear set of the two-stage planetary gear set is the second planetary gear set. The radially outer planetary gear set of the two-stage planetary gear set is the third planetary gear set. The specified planetary gear set is the first planetary gear set. The input section and the second carrier are always engaged together. The first and second sun gears are always engaged together. The first ring gear and the fourth carrier are always engaged together. The second ring gear and the third sun gear are always engaged together. The output section and the first and third carriers are always engaged together. The five frictional engagement elements are: a first clutch engaging and disengaging the input section and the second carrier with and from the fourth sun gear; a second clutch engaging and disengaging the second ring gear and the third sun gear with and from the fourth sun gear; a third clutch engaging and disengaging the third ring gear with and from the fourth sun gear; a first brake engaging and disengaging the first and second sun gears with and from the transmission case; and a second brake engaging and disengaging the fourth ring gear with and from the transmission case.

As a result, an automatic transmission is implemented which provides the forward eight forward gears and one reverse gear, and stably supports a carrier, pinion, and ring gear of the radially outer planetary gear set while reducing the length of the automatic transmission in the axial direction.

In this configuration, it is preferable that the automatic transmission further have the following configuration. The automatic transmission provides eight forward gears and one reverse gear. The first clutch and the first and second brakes are engaged to provide a first gear. The second clutch and the first and second brakes are engaged to provide a second gear. The first and second clutches and the second brake are engaged to provide a third gear. The second and third clutches and the second brake are engaged to provide a fourth gear. The first and third clutches and the second brake are engaged to provide a fifth gear. The first, second, and third clutches are engaged to provide a sixth gear in which a gear reduction ratio of the automatic transmission is 1. The first and third clutches and the first brake are engaged to provide a seventh gear. The second and third clutches and the first brake are engaged to provide an eighth gear. The third clutch and the first and second brakes are engaged to provide a reverse gear.

As a result, in an automatic transmission with eight forward gears and one reverse gear, the frictional engagement elements properly engaged may allow proper gear change.

Also, in each gear, the number of disengaged ones of the five frictional engagement elements, in which the rotational resistance is higher than that in engaged ones of the frictional engagement elements, is less than the number of engaged ones of the five frictional engagement elements. This may efficiently transmit power.

Advantages of the Invention

As can be seen from the foregoing description, an automatic transmission according to the present invention allows for forming a two-stage planetary gear set by arranging two planetary gear sets such that one of the two planetary gear sets is disposed radially inward from the other to reduce the length of the automatic transmission in the axial direction while stably supporting a carrier, pinion, and ring gear of a radially outer planetary gear set of the two-stage planetary gear set. Consequently, this may keep the good gear mesh condition in the radially outer planetary gear set to reduce, e.g., gear noise and a decrease in durability of the gears caused by gear mesh failure.

BRIEF DESCRIPTION OF THE DRAWINGS

FIG. 3 is a table showing the state of engagement of frictional engagement elements at respective gears in the automatic transmission.

FIG. 13 is a table showing exemplary numbers of teeth of gears forming respective planetary gear sets.

FIG. 14 is a table showing the gear reduction ratio in each of the gears and a gear step in each adjacent pair of the gears, where the numbers of the teeth of the gears are as shown in FIG. 13.

DESCRIPTION OF EMBODIMENTS

Embodiments of the present invention will now be described in detail with reference to the drawings.

Figure 1:
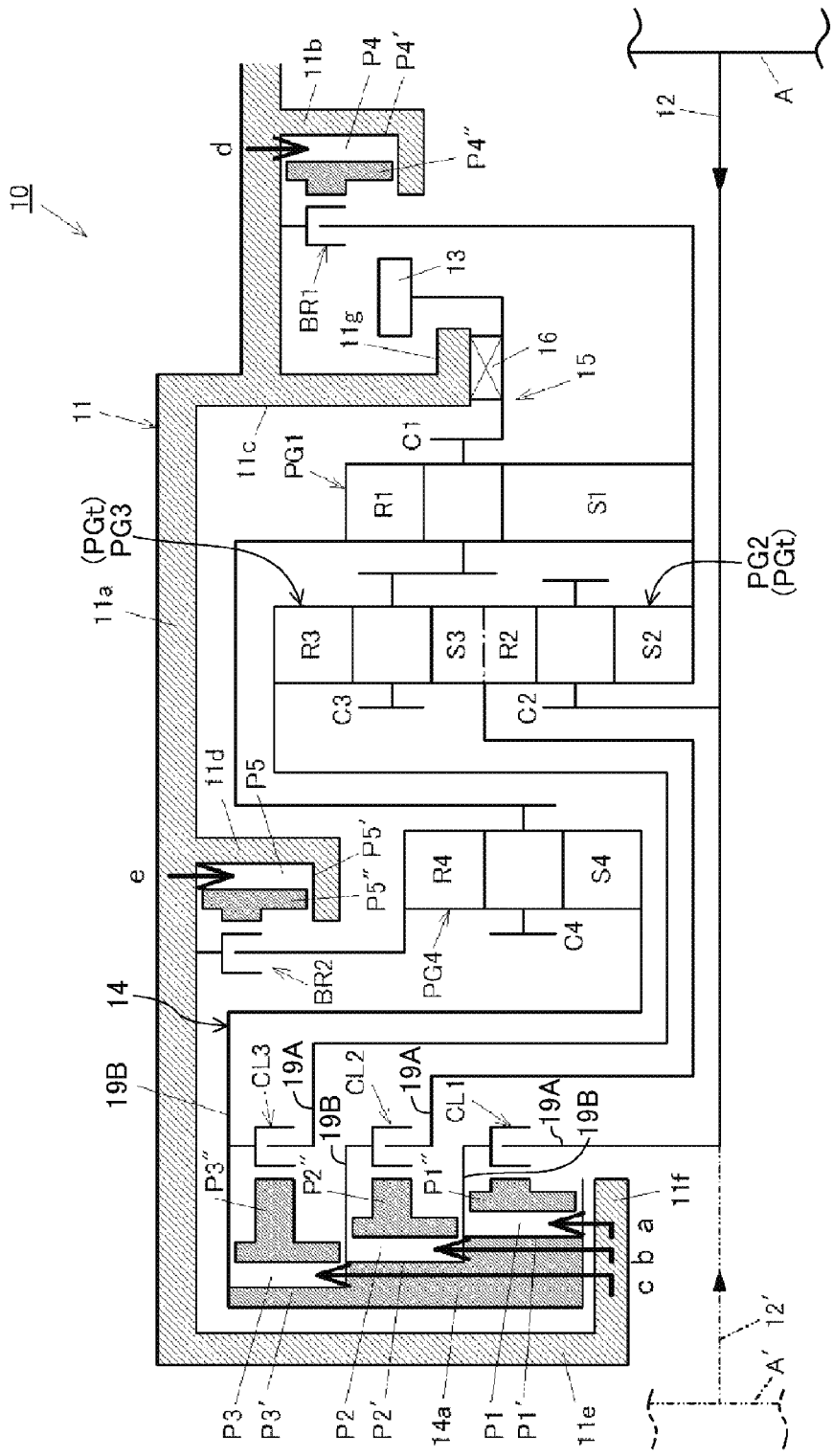
FIG. 1 is a skeleton diagram illustrating an automatic transmission according to a first embodiment of the present invention.

FIG. 1 illustrates the configuration of an automatic transmission 10 according to a first embodiment of the present invention. This automatic transmission 10 is mounted in a vehicle, and provides eight forward gears and one reverse gear.

The automatic transmission 10 includes: in a transmission case 11, an input shaft (input section) 12 extending in an axial direction of the automatic transmission 10 (a left-right direction in FIG. 1) and coupled to a drive source (for example, an engine, an electric motor) A; an output gear (output section) 13 coupled to a differential mechanism; first, second, third, and fourth planetary gear sets PG1, PG2, PG3, and PG4 (hereinafter, referred to as first, second, third, and fourth gear sets PG1, PG2, PG3, and PG4, respectively) forming a plurality of power transmission paths from the input shaft 12 to the output gear 13; and five frictional engagement elements, namely, first, second, and third clutches CL1, CL2, and CL3, and first and second brakes BR1 and BR2, selecting one of the plurality of power transmission paths to switch among them, the input shaft 12, the output gear 13, the first, second, third, and fourth planetary gear sets PG1, PG2, PG3, and PG4, and the five frictional engagement elements are coaxially arranged. The automatic transmission 10 is mounted in the vehicle in a transverse direction such that the axial direction of the automatic transmission 10 is the width direction of the vehicle (i.e., the axis of the automatic transmission 10 extends in the width direction of the vehicle). The axis of the automatic transmission 10 coincides with that of the input shaft 12. Hereinafter, the axial direction of the automatic transmission 10 is referred to as a "transmission axial direction," and a direction perpendicular to the axial direction is referred to as a "transmission radial direction."

The drive source A is disposed closer to one side of the automatic transmission 10 (the right side in FIG. 1) in the transmission axial direction. In the automatic transmission 10, a side closer to the drive source A is referred to as a front side of the automatic transmission 10, and a side away from the drive source A is referred to as a rear side of the automatic transmission 10.

The input shaft 12 extends from the drive source A to a position near the rear end portion of the automatic transmission 10 (the transmission case 11). The output gear 13 is disposed near the front end portion of the automatic transmission 10 (the transmission case 11) (i.e., behind the first brake BR1 and in front of a first intermediate wall portion 11c, which will be described later). The output gear 13 is gear-coupled to an input gear of the differential mechanism through a gear on a countershaft extending parallel to the input shaft 12.

The second and third gear sets PG2 and PG3 form a two-stage planetary gear set PGt (hereinafter referred to as a two-stage gear set PGt) in which the second and third gear sets PG2 and PG3 are arranged at the same position in the transmission axial direction, and arranged in the radial direction (also, the transmission radial direction) such that one of the two planetary gear sets (PG2, PG3) is disposed radially inward from the other. Of the two-stage gear set, the radially inner planetary gear set is the second planetary gear set PG2, and the radially outer planetary gear set is the third planetary gear set PG3.

In the transmission axial direction, the first gear set PG1 is disposed in front of the two-stage gear set PGt, and the fourth gear set PG4 is disposed behind the two-stage gear set PGt. In this embodiment, the first gear set PG1 corresponds to a specified planetary gear set disposed adjacent to the two-stage gear set PGt in the transmission axial direction.

All of the first to fourth gear sets PG1-PG4 are of a single-pinion type. The first gear set PG1 includes a first sun gear S1, a first ring gear R1 and a first carrier C1 functioning as rotating elements. The second gear set PG2 includes a second sun gear S2, a second ring gear R2, and a second carrier C2 functioning as rotating elements. The third gear set PG3 includes a third sun gear S3, a third ring gear R3, and a third carrier C3 functioning as rotating elements. The fourth set PG4 includes a fourth sun gear S4, a fourth ring gear R4, and a fourth carrier C4 functioning as rotating elements. Each of the first to fourth gear sets PG1-PG4 of a single-pinion type further includes a plurality of pinions meshing with the associated sun gear and ring gear, and the pinions are supported by the associated carrier.

The transmission case 11 includes cylindrical wall portion 11a of which the axis extends in the transmission axial direction. This cylindrical wall portion 11a covers, from the radially outer side, the input shaft 12, the output gear 13, the first to fourth gear sets PG1-PG4, the first to third clutches CL1-CL3, and the first and second brakes BR1 and BR2.

In the two-stage gear set PGt, the second ring gear R2 of the radially inner second gear set PG2 and the third sun gear S3 of the radially outer third gear set S3 are integrated formed with each other to be always engaged with each other. The second ring gear R2 and the third sun gear S3 may be implemented as a single component. Alternatively, the second ring gear R2 and the third sun gear S3 may be integrated with each other by fitting the outer peripheral surface of the second ring gear R2 into the inner peripheral surface of the third sun gear S3 by, e.g., welding or shrinkage fit.

Also, the input shaft 12 and the second carrier C2 are always engaged together. The first and second sun gears S1 and S2 are always engaged together. The first ring gear R1 and a fourth carrier C4 are always engaged together. On top of that, the output gear 13, the first carrier C1 (the carrier of the specified planetary gear set), and the third carrier C3 (the carrier of the radially outer third gear set PG3 of the two-stage gear set PGt) are always engaged with one another.

The first clutch CL1 engages and disengages the input shaft 12 and the second carrier C2 with and from the fourth sun gear S4. The second clutch CL2 engages and disengages the second ring gear R2 and the third sun gear S3 with and from the fourth sun gear S4. The third clutch CL3 engages and disengages the third ring gear R3 with and from the fourth sun gear S4.

The first brake BR1 engages and disengages the first and second sun gears S1 and S2 with and from the transmission case 11. The second brake BR2 engages and disengages the fourth ring gear R4 with and from the transmission case 11.

The first to third clutches CL1-CL3 are disposed at the rear end portion of the transmission case 11. The first brake BR1 is disposed at the front end portion of the transmission case 11 (in front of the output gear 13), and the second brake BR2 is disposed at the intermediate portion of the transmission case 11 in the transmission axial direction (at the position radially outward from the fourth gear set PG4).

The first to third clutches CL1-CL3 are arranged in the transmission case 11 adjacent to a rear end wall portion 11e provided at the rear end portion of the transmission case 11 (the cylindrical wall portion 11a) in the transmission axial direction such that, in the transmission radial direction, the clutch CL1 is disposed inwardly from the clutch CL2, and the clutch CL2 is disposed inwardly from the clutch CL3. The first clutch CL1 is disposed at the radially innermost position. The second clutch CL2 is disposed radially outward from the first clutch CL1, and the third clutch CL3 is disposed radially outward from the second clutch CL2.

Each of the first to third clutches CL1-CL3 has a radially inner rotating member 19A and a radially outer rotating member 19B engaged or disengaged with and from each other through friction plates in accordance with supply and release of hydraulic pressure. The first, second, and third clutches CL1, CL2, and CL3 respectively have hydraulic pressure chambers P1, P2, and P3 that are respectively defined by cylinders P1', P2', and P3' and pistons P1", P2", and P3". Each of the cylinders P1', P2', and P3' is comprised of the associated radially outer rotating member 19B of the first, second, and third clutches CL1, CL2, and CL3, and the pistons P1", P2", and P3" are respectively fitted into the cylinders P1', P2', and P3'. When a hydraulic pressure is supplied to the hydraulic pressure chambers P1, P2, and P3, the friction plates of the clutches CL1, CL2, and CL3 are engaged to allow the radially inner rotating members 19A and the radially outer rotating members 19B of the clutches CL1, CL2, and CL3 to be engaged together.

Specifically, the first clutch CL1, when the hydraulic pressure chamber P1 is supplied with a hydraulic pressure, engages the input shaft 12 and the second carrier C2, which are always engaged with the radially inner rotating member 19A of the first clutch CL1, with the fourth sun gear S4, which is always engaged with the radially outer rotating member 19B of the first clutch CL1. The second clutch CL2, when the hydraulic pressure chamber P2 is supplied with a hydraulic pressure, engages the second ring gear R2 and the third ring gear S3, which are always engaged with the radially inner rotating member 19A of the second clutch CL2, with the fourth sun gear S4, which is always engaged with the radially outer rotating member 19B of the second clutch CL2. The third CL3, when the hydraulic pressure chamber P3 is supplied with a hydraulic pressure, engages the third ring gear R3, which is always engaged with the radially inner rotating member 19A of the third clutch CL3, with the fourth sun gear S4, which is always engaged with the radially outer rotating member 19B of the third clutch CL3.

The radially outer rotating members 19B of the first to third clutches CL1-CL3 are always engaged with the fourth sun gear S4. Accordingly, these radially outer rotating members 19B are integrated together, and function as a radially outer common rotating member 14 shared by the three clutches CL1-CL3. A rear end portion 14a of this radially outer common rotating member 14 allows the cylinders P1'-P3' to be arranged such that, in the transmission radial direction, the cylinder P1' is disposed inwardly from the cylinder P2', and the cylinder P2' is disposed inwardly from the cylinder P3'.

The first and second brakes BR1 and BR2 respectively have hydraulic pressure chambers P4 and P5 that are respectively defined by cylinders P4' and P5', and pistons P4" and P5" respectively fitted into the cylinders P4' and P5'. When a hydraulic pressure is supplied to the hydraulic pressure chambers P4 and P5, the friction plates of the brakes BR1 and BR2 are engaged to allow the first brake BR1 to fix the first and second sun gears S1 and S2 to the transmission case 11, and the second brake BR2 to fix the fourth ring gear R4 to the transmission case 11.

The transmission case 11 includes a front end wall portion 11b, first and second intermediate wall portion portions 11c and 11d, and the rear end wall portion 11e. The front end wall portion 11b is disposed at the front end of the transmission case 11 (the cylindrical wall portion 11a), and forms the cylinder P4' of the first brake BR1. The first intermediate wall portion 11c is disposed at an intermediate position in the transmission axial direction (at a position between the output gear 13 and the first gear set PG1) so as to extend inward from the cylindrical wall portion 11a in the transmission radial direction. The second intermediate wall portion 11d is disposed at an intermediate position behind the first intermediate wall portion 11c in the transmission axial direction (at the position outward from the fourth gear set PG4 in the transmission radial direction) so as to extend inward from the cylindrical wall portion 11a in the transmission radial direction, and forms the cylinder P5' of the second brake BR2.

The rear end wall portion 11e is provided with a boss cylindrical portion 11f extending forward from the radially inner end of the rear end wall portion 11e. The inner peripheral surface of the rear end portion 14a of the radially outer common rotating member 14 of the first to third clutches CL1-CL3 is fitted to the outer peripheral surface of this cylindrical portion 11f.

In the rear end wall portion 11e and the cylindrical portion 11f, hydraulic pressure supply passages a, b, and c are formed to respectively supply the hydraulic pressure chambers P1, P2, and P3 of the first, second, and third clutches CL1, CL2, and CL3 with a hydraulic pressure from the transmission case 11. These hydraulic pressure supply passages a, b, and c are disposed so as to respectively communicate with the hydraulic pressure chambers P1, P2, and P3 from the cylindrical portion 11f through the fitting surface between the cylindrical portion 11f and the rear end portion 14a, and the radially outer common rotating member 14.

Communicating portions of the hydraulic pressure supply passages a, b, and c in the fitting surface are sealed with a sealing member, which is not illustrated.

In the cylindrical wall portion 11a, hydraulic pressure supply passages d and e are formed to respectively supply the hydraulic pressure chambers P4 and P5 of the first and second brakes BR1 and BR2 with a hydraulic pressure from the transmission case 11. These hydraulic pressure supply passages d and e are disposed so as to respectively communicate with the hydraulic pressure chambers P4 and P5 directly from the cylindrical wall portion 11a.

In the automatic transmission 10, as described above, the third carrier C3 of the radially outer third gear set PG3 of the two-stage gear set PGt, the first carrier C1 of the first gear set PG1 disposed adjacent to the front portion of the two-stage gear set PGt, and the output gear 13 disposed in front of the first gear set PG1 with the first intermediate wall portion 11c interposed between the output gear 13 and the first gear set PG1 are always engaged together. These are integrated together to constitute a cylindrical structure 15 extending in the transmission axial direction.

The cylindrical structure 15 and the support structure thereof will be described in detail with reference to FIG. 2.

The output gear 13 includes: a radially outer portion 13b having teeth 13a; a cylindrical radially inner portion 13c disposed radially inward from the radially outer portion 13b and extending in the transmission axial direction; and a coupling portion 13d coupling the radially outer and inner portions 13b and 13c together. The radially inner portion 13c is fitted through a bearing 16 into the inner peripheral surface of a cylindrical portion 11g extending forward from the radially inner end of the first intermediate wall portion 11c behind the coupling portion 13d. This enables the output gear 13 to be rotatably supported by the transmission case 11 (the first intermediate wall portion 11c).

A pinion 100 of the first gear set PG1 is provided with a hollow disk member 101 at its front side and a hollow disk member 102 at its rear side, the hollow disk members 101 and 102 functioning as the first carrier C1. The hollow disk members 101 and 102 are integrated together by a pinion shaft 103 passing through the center of the pinion 100 in the transmission radial direction. The pinion 100 is rotatably supported by the pinion shaft 103, and eventually supported by the first carrier C1. Likewise, a pinion 107 of the third gear set PG3 is provided with a hollow disk member 104 at its front side and a hollow disk member 105 at its rear side, the hollow disk members 104 and 105 functioning as the third carrier C3. The hollow disk members 104 and 105 are integrated together by a pinion shaft 106 passing through the center of the pinion 107 in the transmission radial direction. The pinion 107 is rotatably supported by the pinion shaft 106, and eventually supported by the third carrier C3.

The inner peripheral surface of the front hollow disk member 104 of the third carrier C3 is fitted to the outer peripheral surface of the rear hollow disk member 102 of the first carrier C1, and the hollow disk members 102 and 104 are integrated with each other by, e.g., welding. This allows the first and third carriers C1 and C3 to be integrated with each other. The hollow disk members 102 and 104 may be formed as a single component.

Furthermore, the front hollow disk member 101 of the first carrier C1 (disposed behind the first intermediate wall portion 11c) is integrated with a cylindrical portion 101a extending forward from the radially inner end of the first carrier C1. The outer peripheral surface of the cylindrical portion 101a is spline-fitted to the inner peripheral surface of the cylindrically radially inner portion 13c of the output gear 13. A nut 17 is screwed onto the front end of the cylindrical portion 101a of the first carrier C1. This nut 17 engages the hollow disk member 101 of the first carrier C1 with the coupling portion 13d of the output gear 13 with an inner race 16a of the bearing 16 interposed between the hollow disk member 101 and the coupling portion 13d.

As can be seen, the output gear 13, and the first and third carriers C1 and C3 form the cylindrical structure 15, which is rotatably supported by the first intermediate wall portion 11c of the transmission case 11 through the bearing 16.

Figure 2:
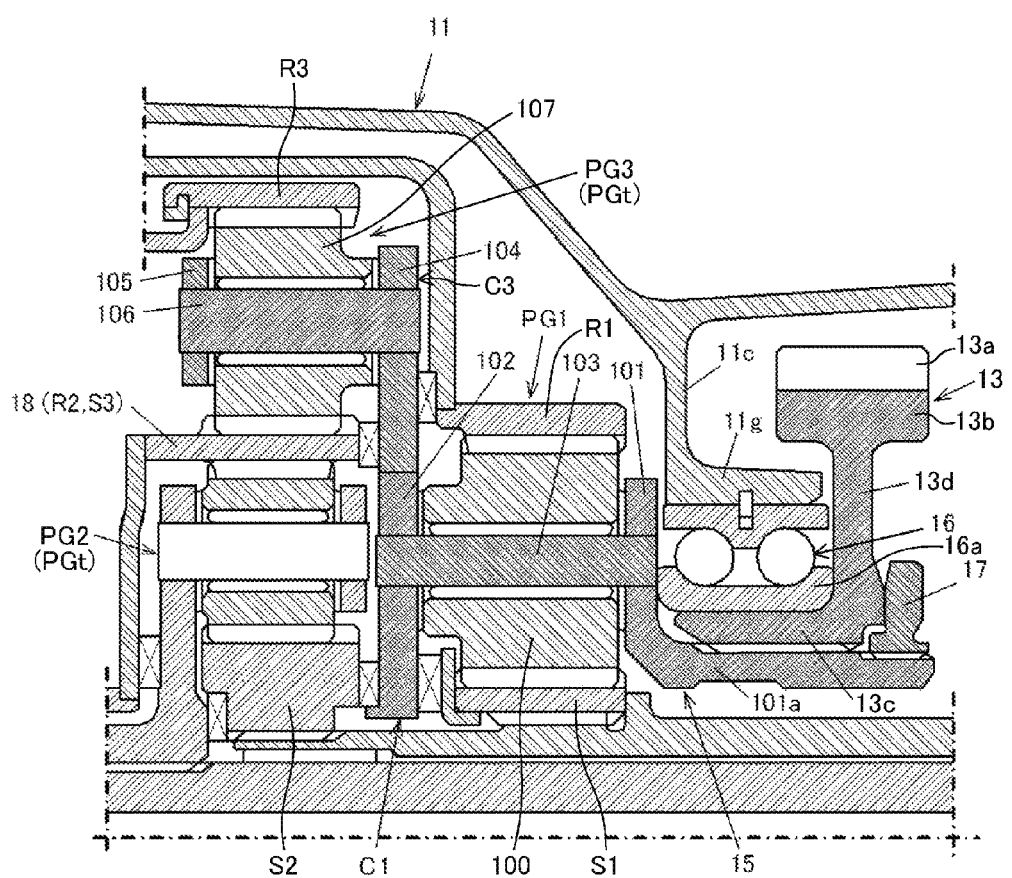
FIG. 2 is a cross-sectional view illustrating the main configuration of the automatic transmission.

In FIG. 2, the second ring gear R2 of the second gear set PG2, and the third sun gear S3 of the third gear set PG3 are implemented as a single component 18.

With such a configuration, the automatic transmission 10 according to this embodiment controls supply and release of a hydraulic pressure with and from the hydraulic pressure chambers P1-P5. This allows for selectively engaging three of the five frictional engagement elements to provide first to eighth forward gears and a reverse gear, as shown in an engagement table of FIG. 3. In the engagement table of FIG. 3, the circles indicate the state where the frictional engagement element is engaged, and the blanks indicate the state where the frictional engagement element is disengaged (released).

Next, it will be described how a gear reduction ratio of the automatic transmission 10 is determined in each gear in accordance with a combination of the frictional engagement elements that are engaged, as shown in the table of FIG. 3.

Figure 4A:
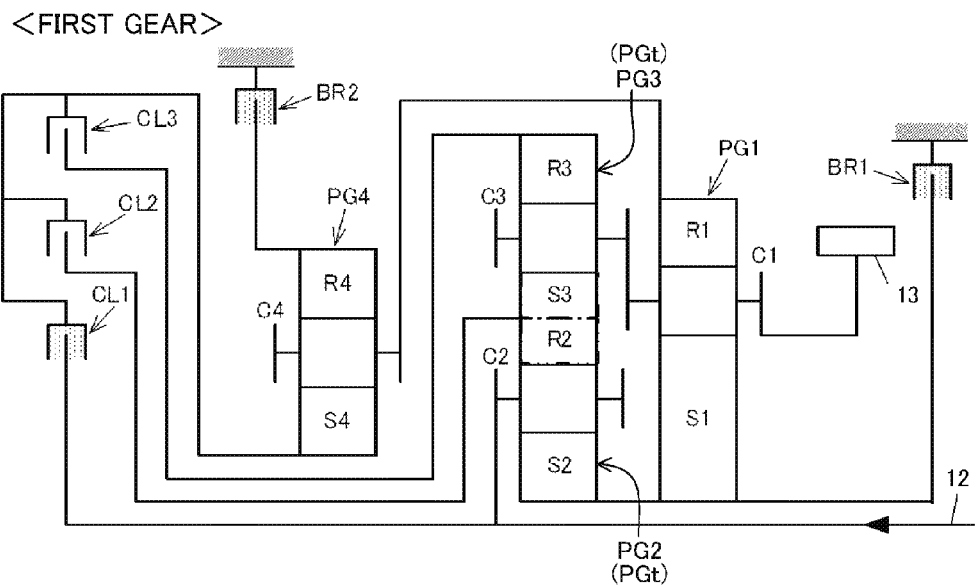
FIG. 4A is a skeleton diagram illustrating the state of engagement of the frictional engagement elements in a first gear.
Figure 5A:
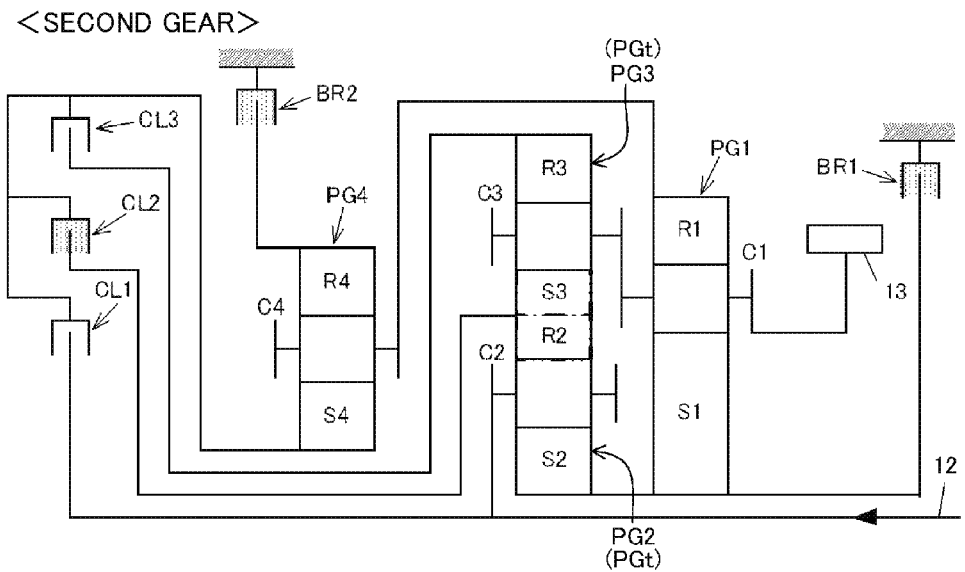
FIG. 5A is a skeleton diagram illustrating the state of engagement of the frictional engagement elements in a second gear.

FIGS. 4A, 5A, . . . , and 12A are skeleton diagrams illustrating the states of engagement of the frictional engagement elements in the respective gears, and are the same as FIG. 1A except that the drive source A, the transmission case 11, the hydraulic pressure chambers P1-P5, and other elements are omitted. In these skeleton diagrams, the frictional engagement elements that are engaged are indicated by shading.

Figure 4B:
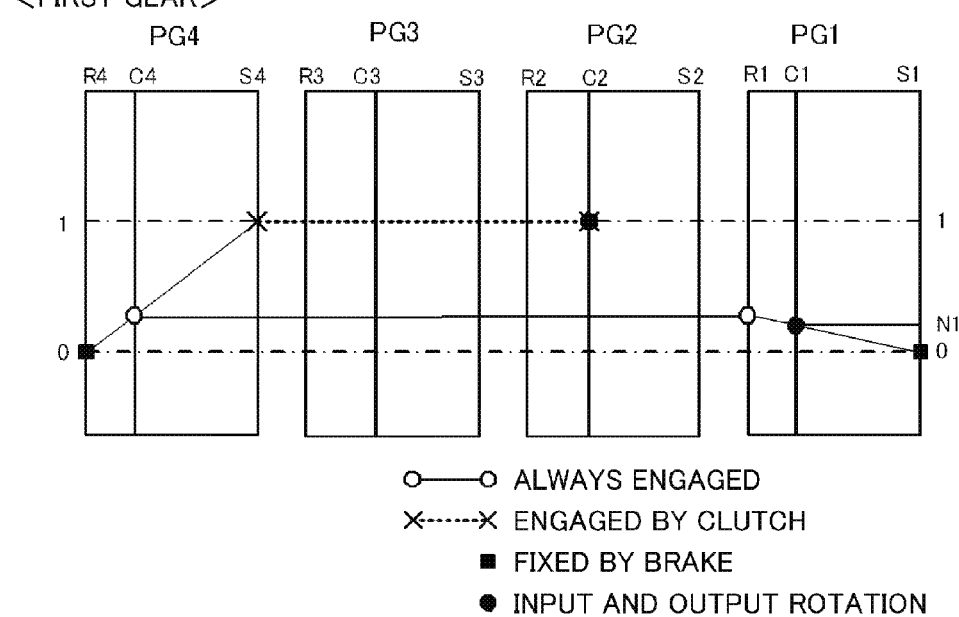
FIG. 4B is a diagram of a gear reduction ratio in the first gear.
Figure 5B:
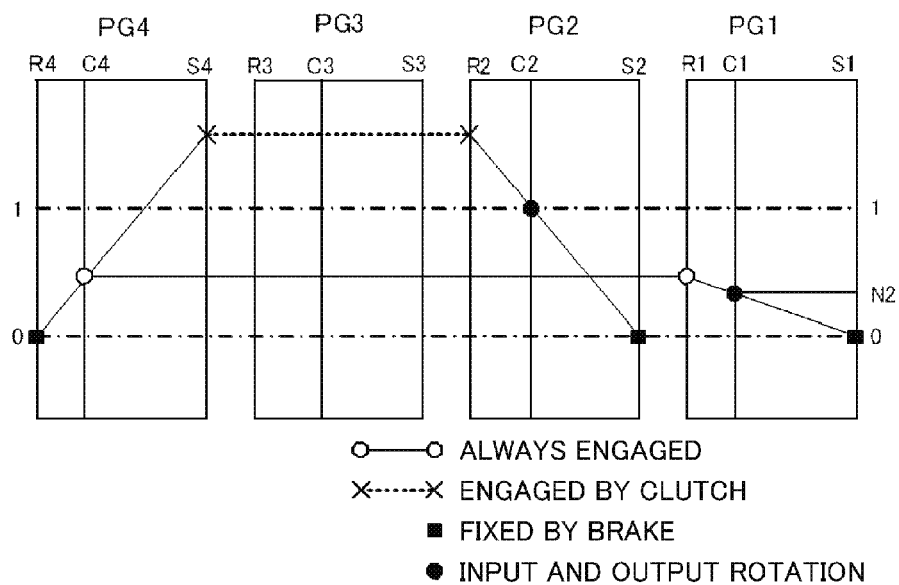
FIG. 5B is a diagram of a gear reduction ratio in the second gear.

FIGS. 4B, 5B, . . . , and 12B are gear reduction ratio diagrams showing the gear reduction ratios in the respective gears in FIGS. 4A, 5A, . . . , and 12A. In these gear reduction ratio diagrams, lateral intervals between the rotating elements in the respective gear sets PG1-PG4 are determined based on respective gear ratios.

The longitudinal axis of the gear reduction ratio diagram indicates a rotational speed. It is assumed that an input rotational speed, i.e., the rotational speed of the input shaft 12 and the second carrier C2 always engaged with the input shaft 12 is "1", and the rotational speed of the rotating element fixed by the brake is "0". The rotational speeds of the rotating elements always engaged together are the same, and the rotational speeds of the rotating elements engaged together through a clutch are the same. N1-N8 and Nr each indicate an output rotational speed in each gear, i.e., rotational speeds of the first and third carriers C1 and C3 (a rotational speed of the output gear 13). The input rotational speed is "1," and thus, the inverse of the output rotational speed is the gear reduction ratio of the automatic transmission 10 in the gear.

First, in the first gear, as shown in FIGS. 4A and 4B, the first clutch CL1, and the first and second brakes BR1 and BR2 are engaged. This allows the input shaft 12 to be engaged with the fourth sun gear S4. As a result, the rotational speed of the fourth sun gear S4 is "1", and the rotational speed of the fourth ring gear R4 is "0". This determines the rotational speed of the fourth carrier C4 and the first ring gear R1 always engaged with the fourth carrier C4. Based on the rotational speed of the first ring gear R1 and a condition in which the rotational speed of the first sun gear S1 is "0", the rotational speed of the first carrier C1 is determined. This rotational speed of the first carrier C1 is the output rotational speed N1 in the first gear.

Next, in the second gear, as shown in FIGS. 5A and 5B, the second clutch CL2, and the first and second brakes BR1 and BR2 are engaged. As a result, the rotational speed of the second carrier C2 always engaged with the input shaft 12 is "1", and the rotational speed of the second sun gear S2 is "0". This determines the rotational speed of the second ring gear R2 and the fourth sun gear S4 always engaged with the second ring gear R2. The rotational speed of the fourth ring gear R4 is "0". This determines the rotational speed of the fourth carrier C4 and the first ring gear R1 always engaged with the fourth carrier C4. Furthermore, the rotational speed of the first sun gear S1 is "0". This determines the rotational speed of the first carrier C1. This rotational speed of the first carrier C1 is the output rotational speed N2 in the second gear.

Figure 6A:
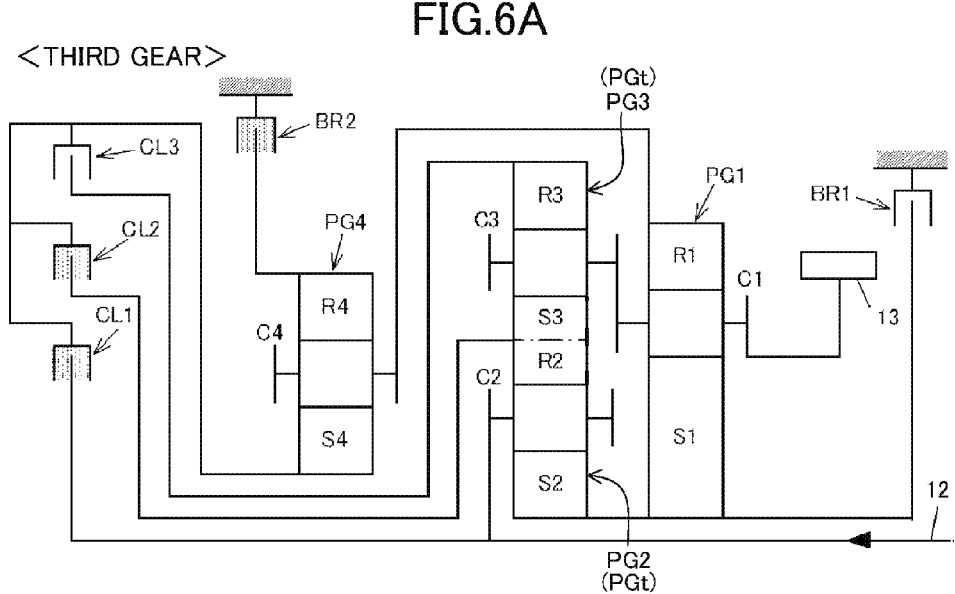
FIG. 6A is a skeleton diagram illustrating the state of engagement of the frictional engagement elements in a third gear.
Figure 6B:
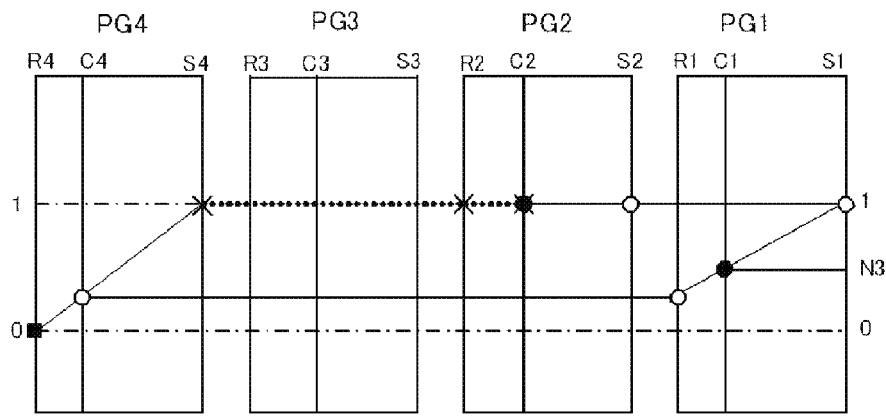
FIG. 6B is a diagram of a gear reduction ratio in the third gear.

Next, in the third gear, as shown in FIGS. 6A and 6B, the first and second clutches CL1 and CL2, and the second brake BR2 are engaged. As a result, the second carrier C2 always engaged with the input shaft 12, and the second ring gear R2 engaged with the input shaft 12 are rotated together at the same rotational speed. This allows the second gear set PG2 to rotate as a whole at the rotational speed of "1". The rotational speed of the first sun gear S1 always engaged with the second sun gear S2, and the rotational speed of the fourth sun gear S4 always engaged with the second ring gear R2 are also "1".

The rotational speed of the fourth ring gear R4 is "0". This determines the rotational speed of the fourth carrier C4 and the first ring gear R1 always engaged with the fourth carrier C4. The rotational speed of the first sun gear S1 is "1". This determines the rotational speed of the first carrier C1, and this rotational speed of the first carrier C1 is the output rotational speed N3 in the third gear.

Figure 7A:
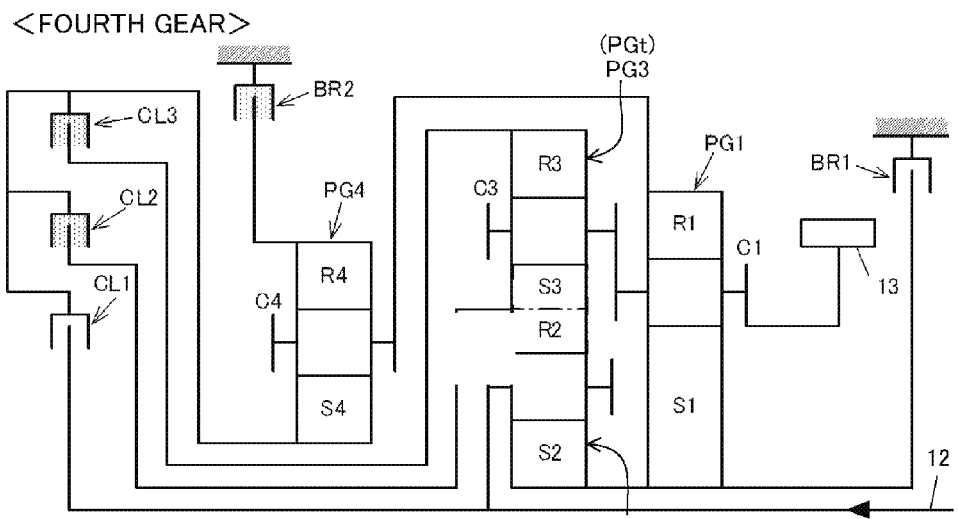
FIG. 7A is a skeleton diagram illustrating the state of engagement of the frictional engagement elements in a fourth gear.
Figure 7B:
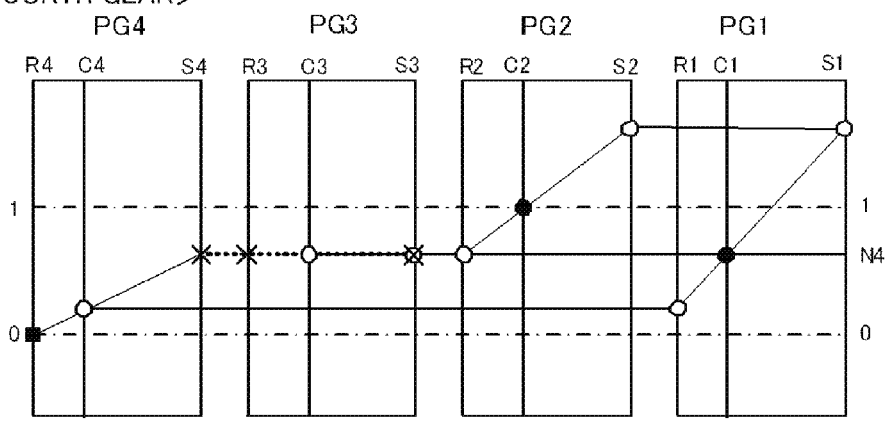
FIG. 7B is a diagram of a gear reduction ratio in the fourth gear.

Next, in the fourth gear, as shown in FIGS. 7A and 7B, the second and third clutches CL2 and CL3, and the second brake BR2 are engaged. As a result, the third sun gear S3 and the third ring gear R3 are rotated together at the same rotational speed to allow the third gear set PG3 to rotate as a whole. The second ring gear R2 integrated with the third sun gear S3, the first carrier C1 always engaged with the third carrier C3, and the fourth sun gear S4 engaged with the third ring gear R3 are also rotated together to allow the third gear set PG3 as a whole.

In addition to the above conditions, the rotational speed of the second carrier C2 is "1" and the rotational speed of the fourth ring gear R4 is "0", and the first and second sun gears S1 and S2 are always engaged together and the first ring gear R1 and the fourth carrier C4 are always engaged together. Based on the above conditions, the rotational speed of the respective rotating elements rotating together are determined, and this rotational speed is the output rotational speed N4 in the fourth gear.

Figure 8A:
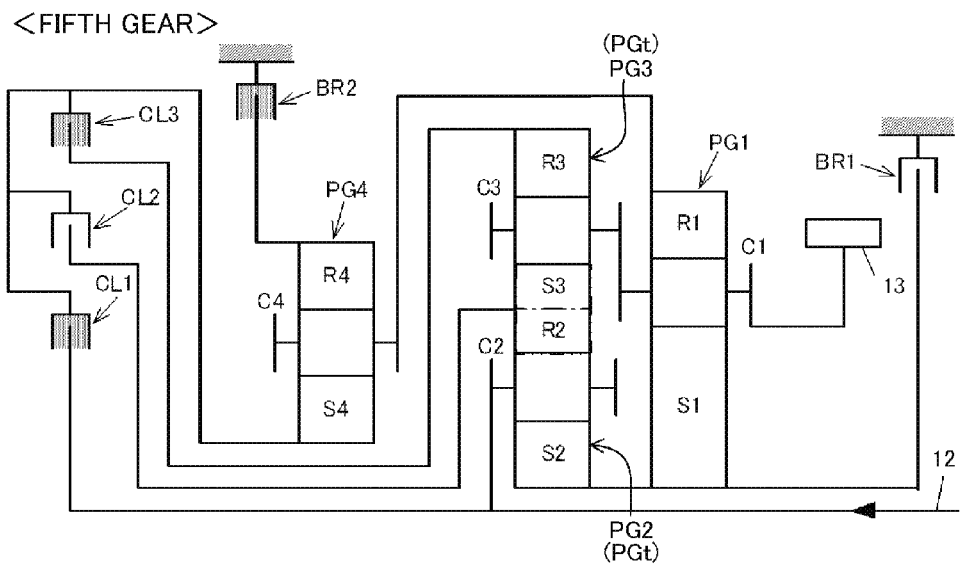
FIG. 8A is a skeleton diagram illustrating the state of engagement of the frictional engagement elements in a fifth gear.
Figure 8B:
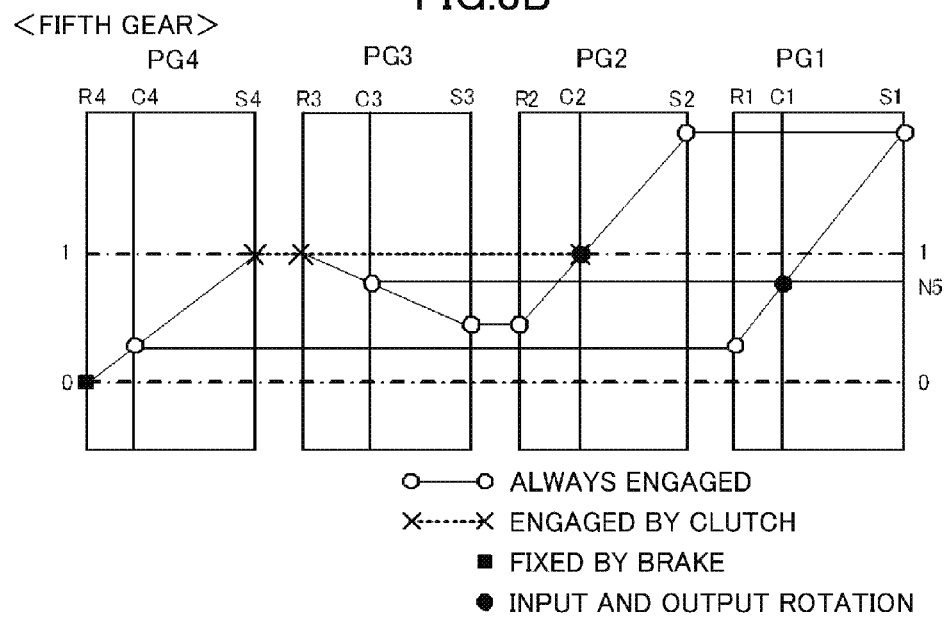
FIG. 8B is a diagram of a gear reduction ratio in the fifth gear.

Next, in the fifth gear, as shown in FIGS. 8A and 8B, the first and third clutches CL1 and CL3, and the second brake BR2 are engaged. As a result, the second carrier C2 always engaged with the input shaft 12 is engaged with the third ring gear R3 and the fourth sun gear S4, and their rotational speed is "1". The rotational speed of the fourth ring gear R4 is "0". This determines the rotational speed of the fourth carrier C4 and the first ring gear R1 always engaged with the fourth carrier C4.

The first and second sun gears S1 and S2 are always engaged together, and the first and third carriers C1 and C3 are always engaged together. On top of that, the second ring gear R2 and the third sun gear S3 are integrated together. This determines the rotational speed of the first carrier C1, and this rotational speed is the output rotational speed N5 in the fifth gear.

Figure 9A:
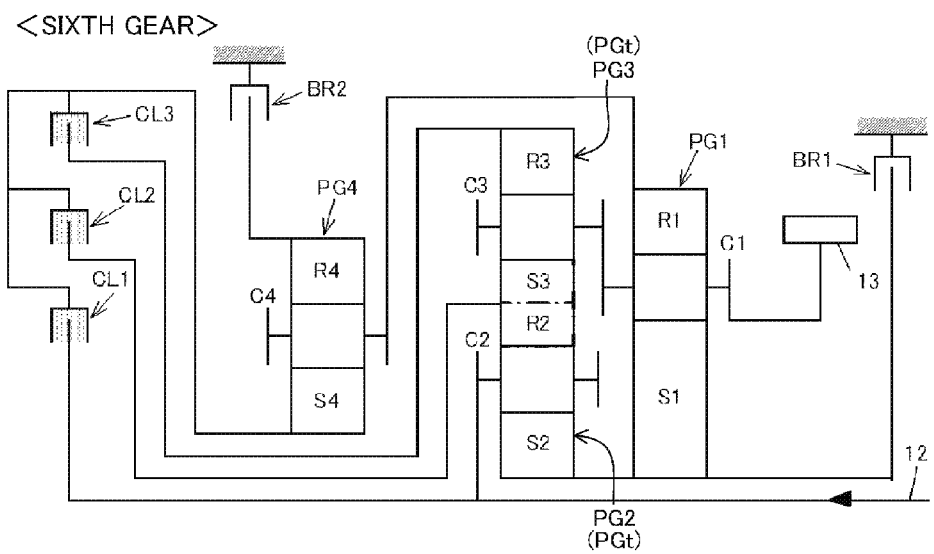
FIG. 9A is a skeleton diagram illustrating the state of engagement of the frictional engagement elements in a sixth gear.
Figure 9B:
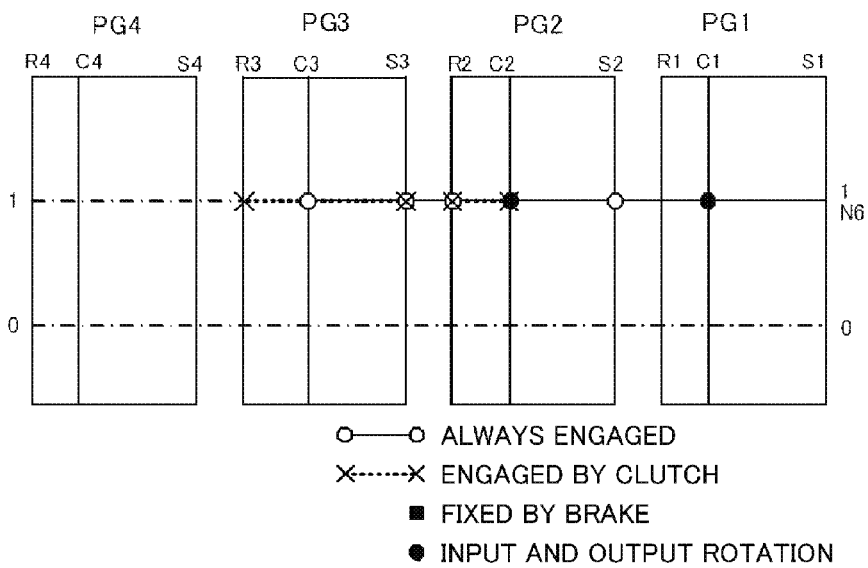
FIG. 9B is a diagram of a gear reduction ratio in the sixth gear.

Next, in the sixth gear, as shown in FIGS. 9A and 9B, the first, second, and third clutches CL1, CL2, and CL3 are engaged. As a result, the second ring gear R2 engaged with the input shaft 12, and the second carrier C2 always engaged with the input shaft 12 are rotated at the same rotational speed. This allows the second gear set PG2 to rotate as a whole at the rotational speed of "1". The second ring gear R2 and the third ring gear S3 are integrated together, and the third sun gear S3 and the third ring gear R3 are rotated together at the same rotational speed. This allows the third gear set PG3 to rotate as a whole at the rotational speed of "1".

This rotational speed of "1" is output through the first carrier C1 from the third carrier C3 as the output rotational speed N6 in the sixth gear. As a result, the sixth gear is a direct gear. That is, the gear reduction ratio in the sixth gear is 1.

Figure 10A:
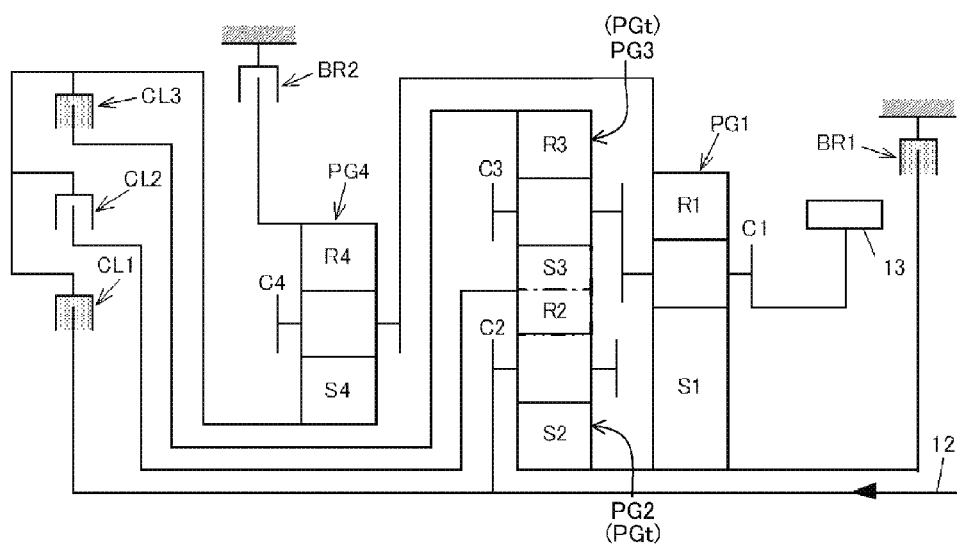
FIG. 10A is a skeleton diagram illustrating the state of engagement of the frictional engagement elements in a seventh gear.
Figure 10B:
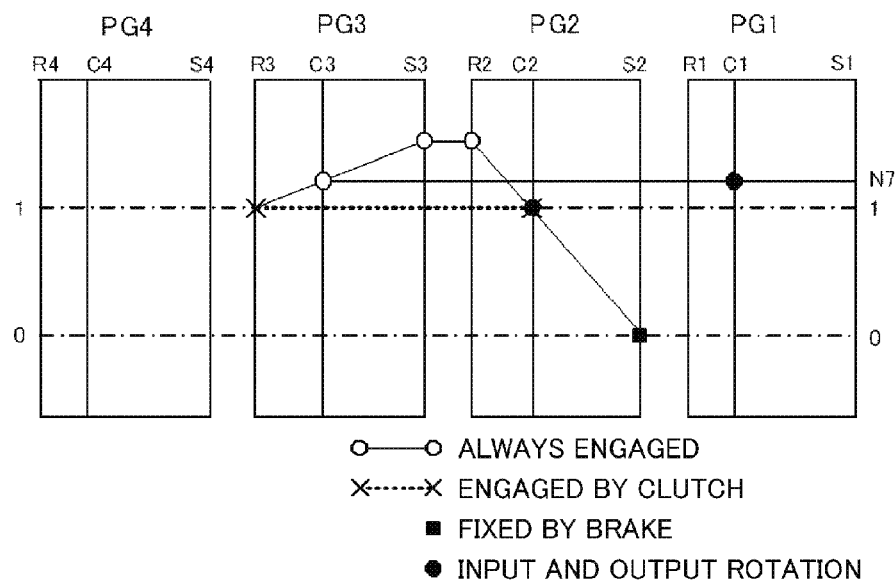
FIG. 10B is a diagram of a gear reduction ratio in the seventh gear.

Next, in the seventh gear, as shown in FIGS. 10A and 10B, the first and third clutches CL1 and CL3, and the first brake BR1 are engaged. As a result, the rotational speed of the second sun gear S2 is "0", and the rotational speed of the second carrier C2 always engaged with the input shaft 12 is "1". This determines the rotational speed of the second ring gear R2 and the third sun gear S3 integrated with the second ring gear R2. The rotational speed of the third ring gear R3 engaged with the second carrier C2 is "1". This determines the rotational speed of the third carrier C3. This rotational speed is output through the first carrier C1 as the output rotational speed N7 in the seventh gear.

Figure 11A:
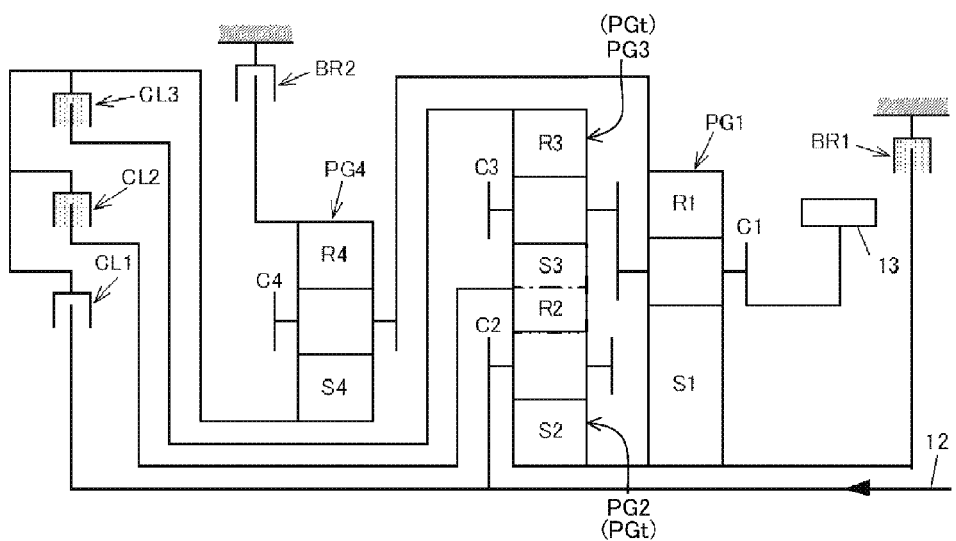
FIG. 11A is a skeleton diagram illustrating the state of engagement of the frictional engagement elements in an eighth gear.
Figure 11B:
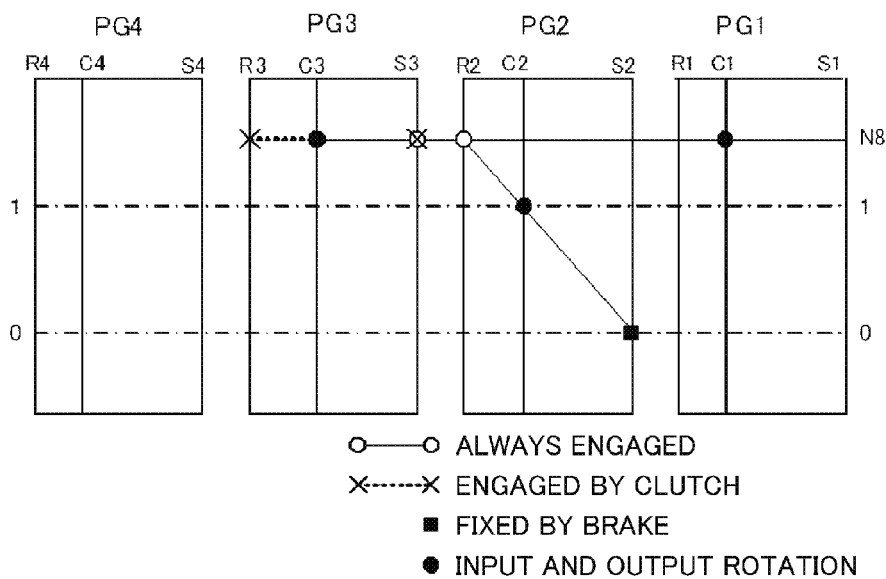
FIG. 11B is a diagram of a gear reduction ratio in the eighth gear.

Next, in the eighth gear, as shown in FIGS. 11A and 11B, the second and third clutches CL2 and CL3, and the first brake BR1 are engaged. As a result, the rotational speed of the second sun gear S2 is "0", and the rotational speed of the second carrier C2 always engaged with the input shaft 12 is "1". This determines the rotational speed of the second ring gear R2 and the third sun gear S3 integrated with the second ring gear R2.

The third sun gear S3 and the third ring gear R3 are engaged together at the same rotational speed to allow the third gear set PG3 to rotate as a whole. This rotational speed of the third planetary gear set PG3 is output through the first carrier C1 from the third carrier C3 as the output rotational speed N8 in the eighth gear.

Figure 12A:
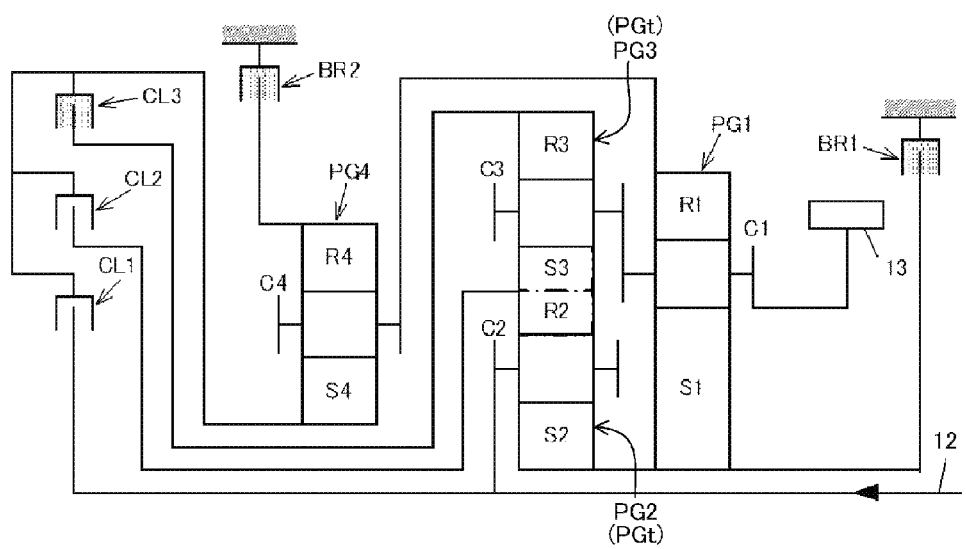
FIG. 12A is a skeleton diagram illustrating the state of engagement of the frictional engagement elements in a reverse gear.
Figure 12B:
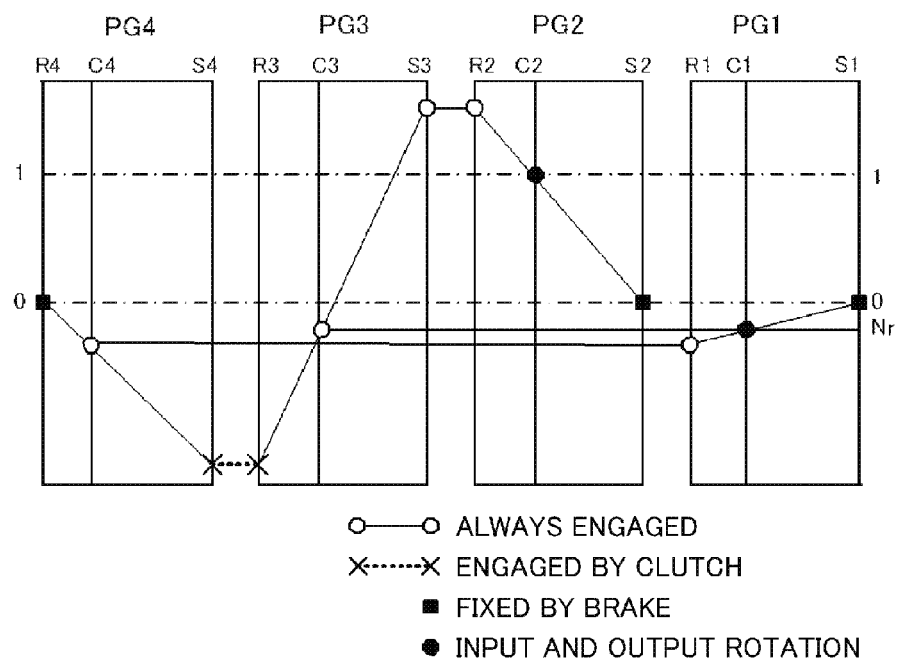
FIG. 12B is a diagram of a gear reduction ratio in the reverse gear.

Next, in the reverse gear, as shown in FIGS. 12A and 12B, the third clutch CL3, and the first and second brakes BR1 and BR2 are engaged. As a result, the rotational speed of the second carrier C2 always engaged with the input shaft 12 is "1", and the rotational speed of the second sun gear S2 is "0". This determines the rotational speed of the second ring gear R2 and the third sun gear S3 integrated with the second ring gear R2.

In addition to the above conditions, the third ring gear R3 and the fourth sun gear S4 are engaged together to be rotated together at the same rotational speed. The rotational speed of the first sun gear S1 and the rotational speed of the fourth ring gear R4 are "0". The first ring gear R1 and the fourth carrier C4 are always engaged together, and the third carrier C3 and the first carrier C1 are always engaged together. Based on the above conditions, the rotational speed of the first carrier C1 is determined, and this rotational speed is the output rotational speed Nr in the reverse gear, in which the traveling direction is opposite to that in the forward gear.

As can be seen, the rotational speeds N1-N8 and Nr may be set to satisfy the expressions, $0<N1<N2<N3<N4<N5<N6<N7<N8$, and $Nr<0$ by the combination of the engaged frictional engagement elements, shown in FIG. 3. With the above configurations, the output rotational speed N6 in the sixth gear is the same as the input rotational speed (N6=1). This may provide the automatic transmission 10 which provides eight forward gears and one reverse gear and in which the gear reduction ratio in the sixth gear is 1.

Here, FIG. 14 shows the gear reduction ratio in each of the gears and a gear step in each adjacent pair of the forward gears, where the numbers of teeth of gears constituting the first to fourth gear sets PG1-PG4 are set as shown in FIG. 13. The gear steps are obtained by dividing the gear ratio in the first gear by the gear ratio in the second gear, the gear ratio in the second gear by the gear ratio in the third gear, the gear ratio in the third gear by the gear ratio in the fourth gear, the gear ratio in the fourth gear by the gear ratio in the fifth gear, the gear ratio in the fifth gear by the gear ratio in the sixth gear, the gear ratio in the sixth gear by the gear ratio in the seventh gear, and the gear ratio in the seventh gear by the gear ratio in the eighth gear. Accordingly, the substantially uniform gear step may be obtained between gears.

As described above, in the automatic transmission 10 according to this embodiment, the second and third gear sets PG2 and PG3 are arranged in the radial direction (the transmission radial direction) such that one of the second and third gear sets PG2 and PG3 is disposed radially inward from the other to form the two-stage gear set PGt. This may reduce the overall length of the automatic transmission 10 in the transmission axial direction, compared to a transmission in which the second and third gear sets PG2 and PG3 are arranged in parallel with each other in the transmission axial direction. In this embodiment, the first to third clutches CL1-CL3 are also arranged in parallel with one another in the transmission radial direction. This may further reduce the overall length of the automatic transmission 10 in the transmission radial direction.

The third carrier C3 of the radially outer third gear set PG3 of the two-stage gear set PGt, the first carrier C1 of the first gear set PG1 disposed adjacent to the front portion of the two-stage gear set PGt, and the output gear 13 disposed in front of the first gear set PG1 with the first intermediate wall portion 11c interposed therebetween are engaged together to form the cylindrical structure 15 extending in the transmission axial direction and having a relatively longer length in the transmission axial direction. This cylindrical structure 15 is rotatably supported by the first intermediate wall portion 11c of the transmission case 11 through the bearing 16. This allows stable support for the third carrier C3 (and the pinion supported by the third carrier C3) of the radially outer third gear set PG3 of the two-stage gear set PGt, the third carrier C3 having a large diameter. This allow stable support for the third ring gear R3 disposed radially outward from the pinion.

Therefore, the rotation axes of the third carrier C3, pinion, and third ring gear R3 of the third gear set PG3 are hardly tilted with respect to the transmission axial direction. Consequently, this reduces gear mesh failure in the third gear set PG3 (i.e., failure of mesh between the sun gear S3 and the pinion, and failure of mesh between the pinion and the ring gear R3) caused by this tilt, and thereby reduces gear noise and a decrease in durability of the gears.

In the automatic transmission 10, the hydraulic pressure supply passages a, b, and c respectively supplying the hydraulic pressure chambers P1, P2, and P3 of the first, second, and third clutches CL1, CL2, and CL3 with a hydraulic pressure from the transmission case 11 are disposed so as to pass through the rear end wall portion 11e and the cylindrical portion 11f of the transmission case 11 to respectively communicated with the hydraulic pressure chambers P1, P2, and P3 from the cylindrical portion 11f through the gap between the outer peripheral surface of the cylindrical portion 11f and the inner peripheral surface of the rear end portion 14a of the radially outer common rotating member 14 in the first to third clutches CL1-CL3, these peripheral surfaces being fitted to each other, and the radially outer common rotating member 14. Therefore, the hydraulic pressure supply passages a, b, and c are provided such that a hydraulic pressure is directly supplied from the transmission case 11 to the respective first to third clutches CL1-CL3 without passing through another oil passage provided in an element other than the elements forming the clutches.

That is to say, the first to third clutches CL1-CL3 are radially arranged near the rear end wall portion 11e of the transmission case 11 such that the clutch CL1 is disposed radially inwardly from the clutch CL2, and the clutch CL2 is disposed radially inwardly from the clutch CL3. Thus, the first to third clutches CL1-CL3 are disposed without being covered with the planetary gear sets and an element other than the elements forming the clutches. This may allow the hydraulic pressure supply passages a, b, and c to directly introduce a hydraulic pressure into the respective hydraulic pressure chambers P1-P3 from the transmission case 11, as described above, without passing through another oil passage provided in an element other than the elements forming the clutches.

Figure 18:
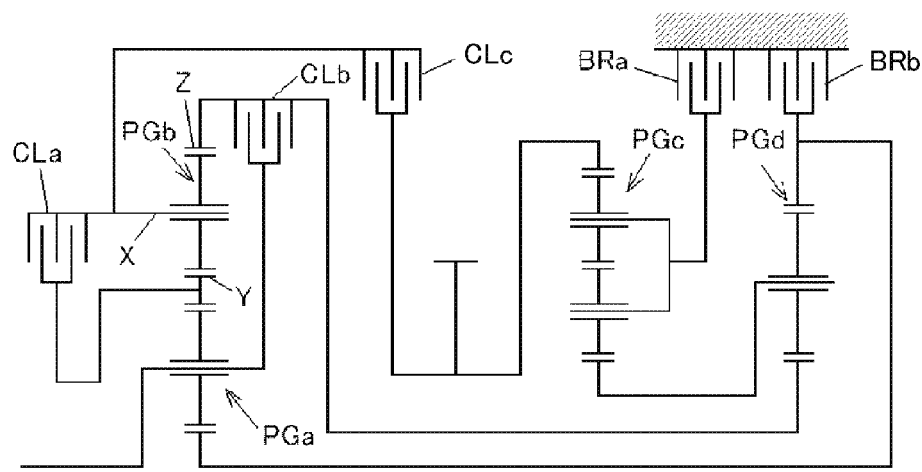
FIG. 18 is a skeleton diagram illustrating a conventional exemplary automatic transmission with eight forward gears.

Here, in a second clutch CLb of a conventional automatic transmission shown in, e.g., FIG. 18, both sides of the second clutch CLb in the transmission axial direction and the radially outer side of the second clutch CLb are covered with a planetary gear set and a power transmission element. Therefore, a hydraulic pressure is supplied to the second clutch CLb through an oil passage passing through the radially inner side of the planetary gear set, such as an oil passage passing through the radially inner side of the planetary gear set and provided in, e.g., a shaft member or a sleeve member. Compared to such a configuration, this embodiment may shorten and simplify the hydraulic pressure supply passages a, b, and c to the hydraulic pressure chambers P1-P3. This may reduce, e.g., an increase in the size of the automatic transmission 10, and a deterioration of responsiveness of gear change control.

Figure 15:
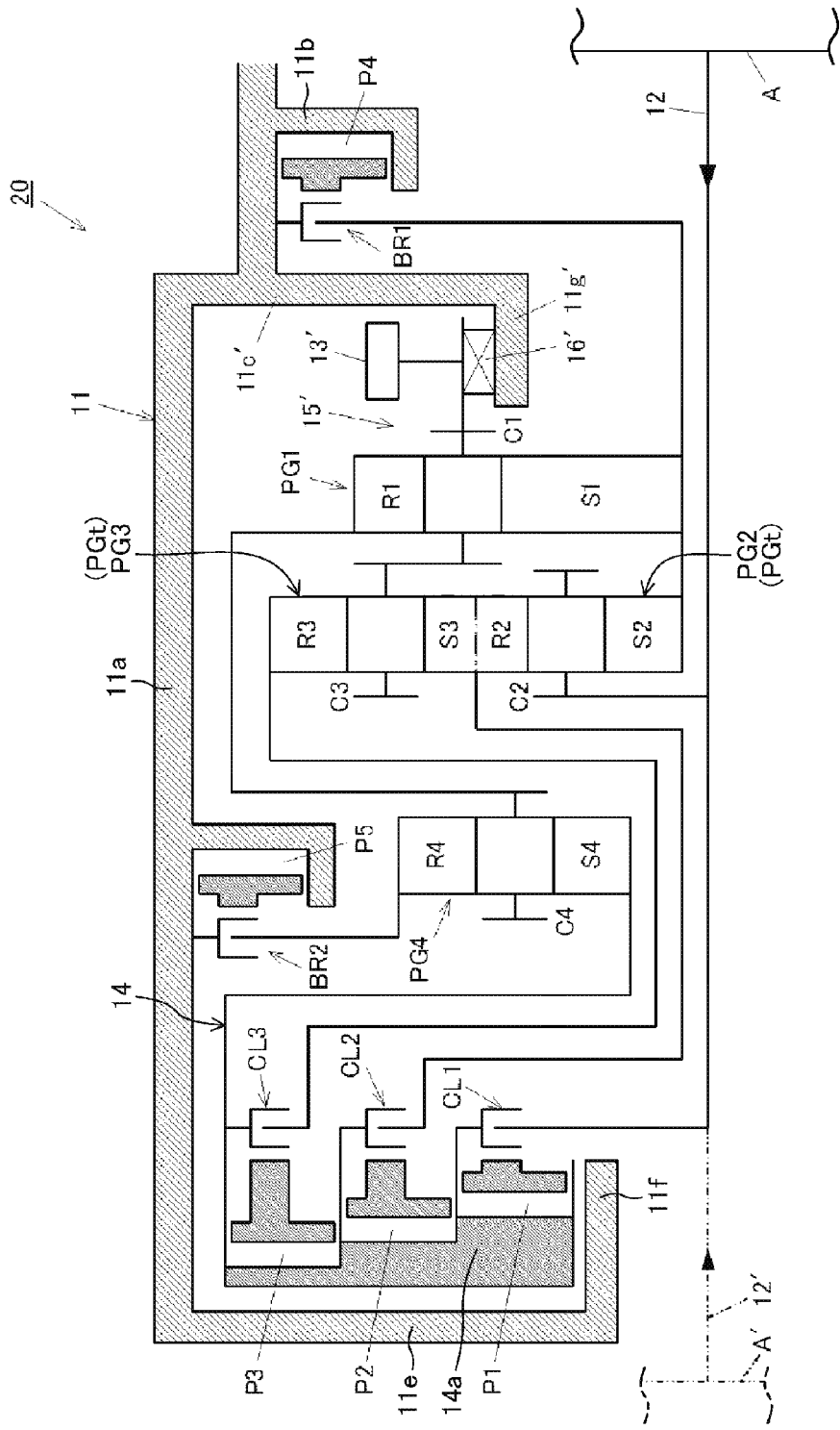
FIG. 15 is a skeleton diagram of an automatic transmission according to a second embodiment.
Figure 16:
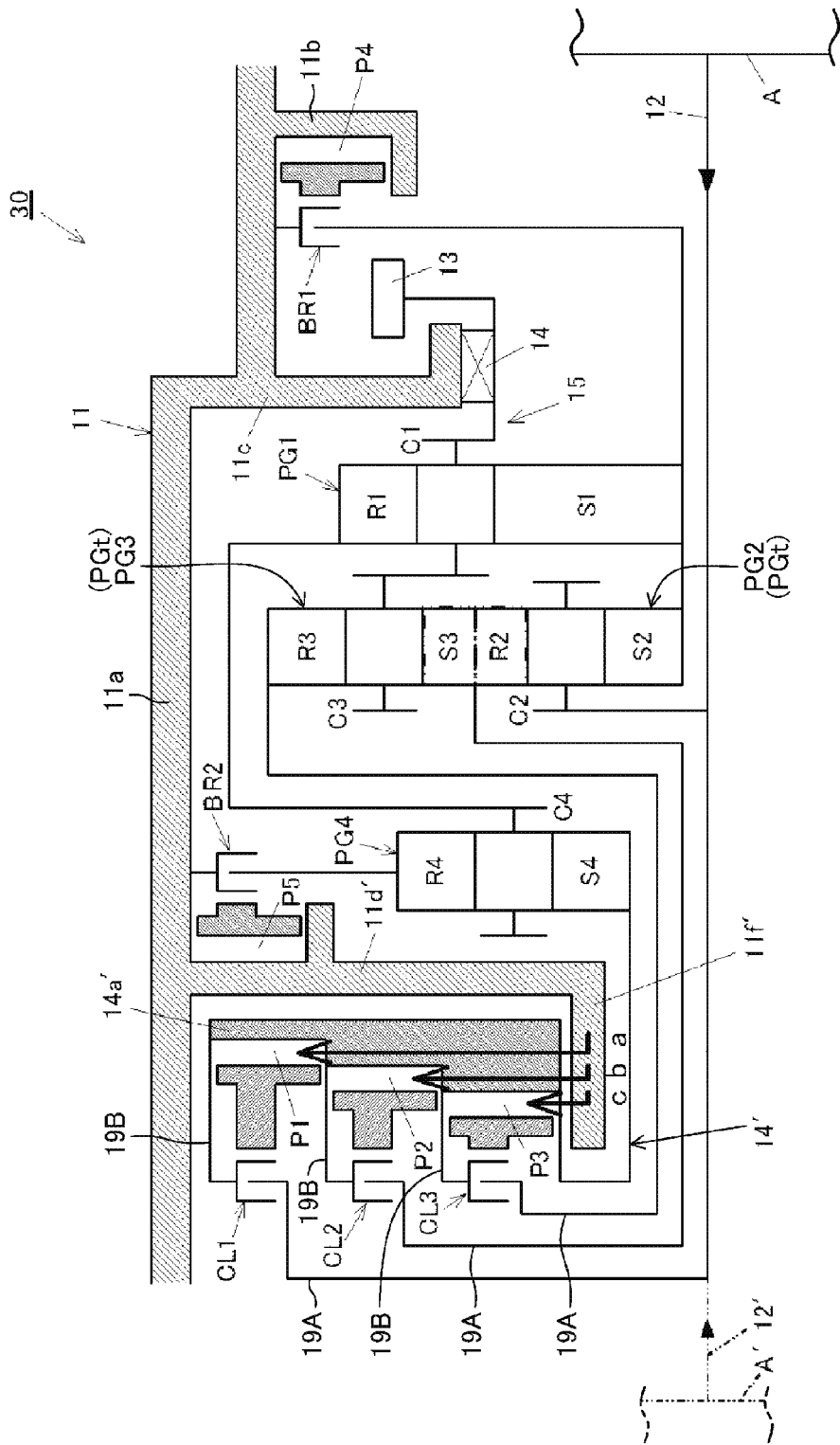
FIG. 16 is a skeleton diagram of an automatic transmission according to a third embodiment.
Figure 17:
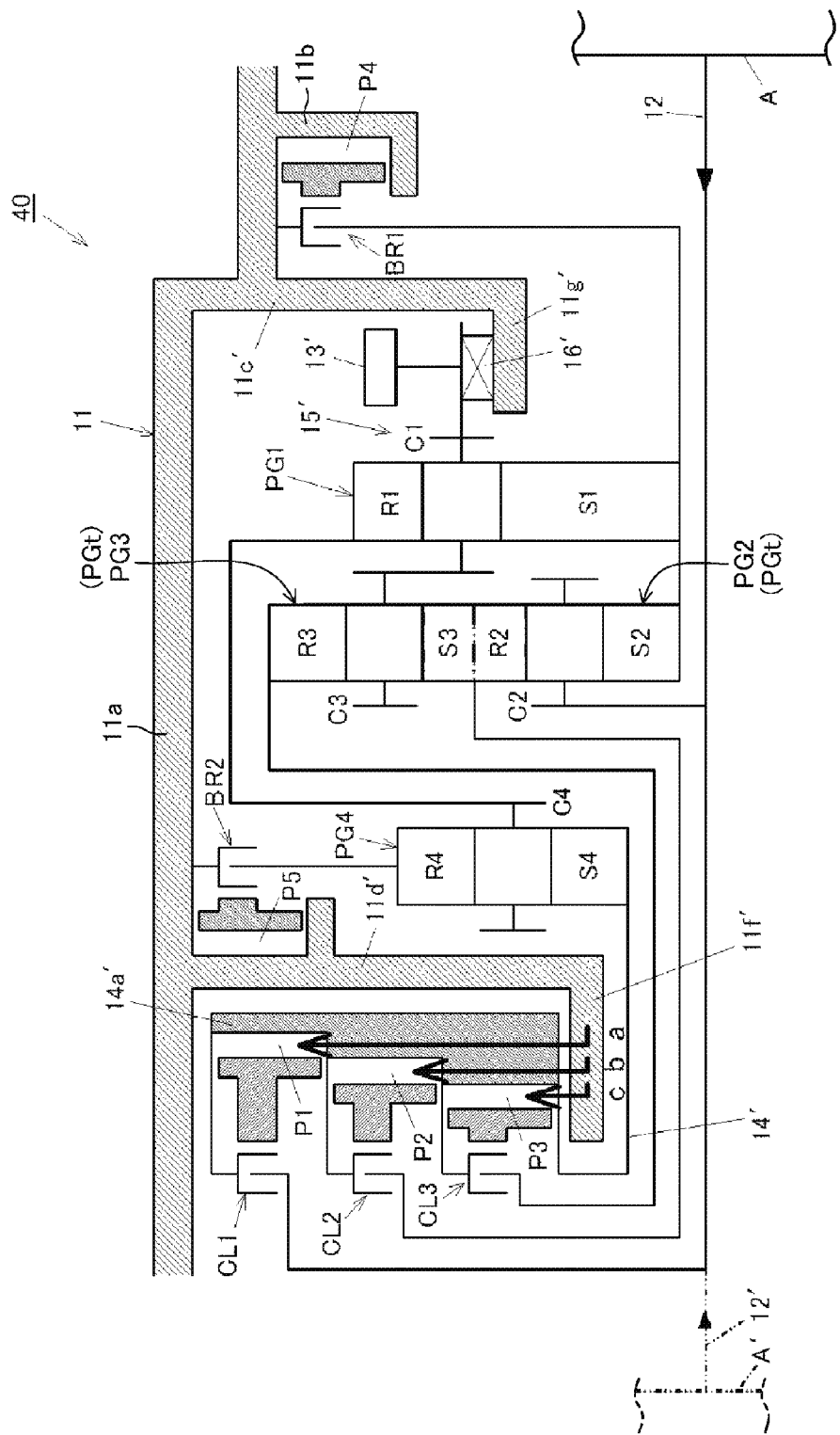
FIG. 17 is a skeleton diagram of an automatic transmission according to a fourth embodiment.

Next, automatic transmissions 20-40 according to second to fourth embodiments respectively illustrated in FIGS. 15-17 will be described. In FIGS. 15-17, the same reference characters as those shown in FIG. 1 are used to represent equivalent basic elements such as gear sets and frictional engagement elements.

The automatic transmission 20 illustrated in FIG. 15 includes an output gear 13' disposed at a different location from the counterpart of the automatic transmission 10 according to the first embodiment. Other than that, the input shaft 12, the first to fourth gear sets PG1-PG4, the first to third clutches CL1-CL3, and the first and second brakes BR1 and BR2 are disposed at the same location as those in the automatic transmission 10.

In the automatic transmission 20, the rotating elements engaged and disengaged by the first to third clutches CL1-CL3, and the rotating elements engaged and disengaged with and from the transmission case 11 by the first and second brakes BR1 and BR2 are also the same as those in the automatic transmission 10. Also, the first and third carriers C1 and C3 and the output gear 13' are integrated together to form a cylindrical structure 15', just like the same as in the automatic transmission 10. Furthermore, the third gear set PG3 is disposed radially outward from the second gear set PG2, and the second and third gear sets PG2 and PG3 form the two-stage gear set PGt, just like the same as in the automatic transmission 10.

In the automatic transmission 10, the output gear 13 disposed in front of the first gear set PG1 with the first intermediate wall portion 11c interposed therebetween, and the bearing 16 supporting the cylindrical structure 15 is disposed on the inner peripheral surface of a cylindrical portion 11g extending forward from the radially inner end of the first intermediate wall portion 11c. On the other hand, the output gear 13' of the automatic transmission 20 is disposed behind a first intermediate wall portion 11c' of the transmission case 11 and in front of and adjacent to the first gear set PG1.

In the automatic transmission 20, the bearing 16' supporting the cylindrical structure 15' including the output gear 13' is disposed on the outer peripheral surface of a cylindrical portion 11g' extending rearward from the radially inner end of the first intermediate wall portion 11c'.

Therefore, in this automatic transmission 20, the cylindrical structure 15' is rotatably supported by the first intermediate wall portion 11c' of the transmission case 11 through the bearing 16'. This allows stable support for the third carrier C3 (and the pinion supported by the third carrier C3) of the radially outer third gear set PG3 of the two-stage gear set PGt, the third carrier C3 having a large diameter. This allows stable support for the third ring gear R3 disposed radially outward from the pinion. Consequently, this reduces gear noise or a decrease in gear durability caused by unstable support for the third carrier C3, pinion, and third ring gear R3 of the third gear set PG3, and tilt of the rotation axes of these elements with respect to the transmission axial direction.

The automatic transmission 30 according to the third embodiment illustrated in FIG. 16 has the same basic configuration as the automatic transmission 10, except how the first to third clutches CL1-CL3, and the second brake BR2 are disposed.

That is to say, the automatic transmission 10 has the following configuration. Specifically, the hydraulic pressure chamber P5 of the second brake BR2 is formed behind the second intermediate wall portion 11d of the transmission case 11. The inner peripheral surface of the rear end portion 14a of the radially outer common rotating member 14 in the first to third clutches CL1-CL3 is fitted to the outer peripheral surface of the cylindrical portion 11f provided so as to extend forward from the radially inner end of the rear end wall portion 11e. Through the gap between these fitting surfaces, the hydraulic pressure supply passages a, b, and c are formed which respectively communicate with the hydraulic pressure chambers P1, P2, and P3 of the clutches CL1, CL2, and CL3.

On the other hand, the automatic transmission 30 has the following configuration. Specifically, a second intermediate wall portion 11d' of the transmission case 11 is extended inward of the second intermediate wall portion 11d thereof, and a cylindrical portion 11f' is formed so as to extend rearward from the radially inner end of the second intermediate wall portion 11d'. The hydraulic pressure chamber P5 of the second brake BR2 is formed by the front surface of a radially outer portion of the second intermediate wall portion 11d'. A rear end portion 14a' of a radially outer common rotating member 14' of the first to third clutches CL1-CL3 is provided so as to be bent to make a U-turn behind the cylindrical portion 11f' after passing through the radially inner side of the cylindrical portion 11f', extend forward along the radially outer side of the cylindrical portion 11f' and then, extend radially outward. Then, the inner peripheral surface of a portion of the rear end portion 14a' located radially outward of the cylindrical portion 11f' is fitted to the outer peripheral surface of the cylindrical portion.

The rear end portion 14a' has a portion extending radially outward, and this portion forms part of the hydraulic pressure chambers P1-P3 of the first to third clutches CL1-CL3 arranged in the transmission radial direction such that the clutch CL3 is disposed radially inwardly from the clutch CL2, and the clutch CL2 is disposed radially inwardly from the clutch CL1. The front surface of this portion is disposed so as to be adjacent to the rear surface of the second intermediate wall portion 11d'. The hydraulic pressure supply passages a, b, and c respectively supplying the hydraulic pressure chambers P1, P2, and P3 of the first, second, and third clutches CL1, CL2, and CL3 with a hydraulic pressure from the transmission case 11 are disposed so as to pass through the second intermediate wall portion 11d' and the cylindrical portion 11f' to respectively communicate with the hydraulic pressure chambers P1, P2, and P3 from the cylindrical portion 11f' through the gap between the inner peripheral surface of a portion of the rear end portion 14a' located radially outward from the cylindrical portion 11f' and the outer peripheral surface of the cylindrical portion 11f', these peripheral surface being fitted to each other, and the radially outer common rotating member 14'.

In the automatic transmission 30, radially inner rotating members 19A of the first to third clutches CL1-CL3 pass through the radially inner side of the second intermediate wall portion 11d'. Therefore, the first to third clutches CL1-CL3 are arranged in this order from the radially outer side in the transmission radial direction. In this regard, this automatic transmission 30 is different from the automatic transmission 10 where the first to third clutches CL1-CL3 are arranged in this order from the radially inner side in the transmission radial direction. The rotating elements engaged and disengaged by the clutches CL1-CL3 are the same as those in the automatic transmission 10.

Accordingly, in the automatic transmission 30, the hydraulic pressure supply passages a, b, and c are also simplified. On top of that, the cylindrical structure 15 is comprised of the first and third carriers C1 and C3 and the output gear 13. This allows stable support for the third carrier C3, pinion, and third ring gear R3 of the third gear set PG3 of the two-stage gear set PGt. Consequently, gear noise and a decrease in gear durability are reduced.

The automatic transmission 40 according to the fourth embodiment illustrated in FIG. 17 is obtained by applying the location of the outpour gear 13' and the support configuration of the cylindrical structure 15' in the automatic transmission 20 to the automatic transmission 30.

That is to say, in the automatic transmission 40, as in the automatic transmission 20, the output gear 13' is disposed adjacent to the first gear set PG1 behind the first intermediate wall portion 11c' of the transmission case 11, and the bearing 16' supporting the cylindrical structure 15' including the output gear 13' is disposed on the outer peripheral surface of a cylindrical portion 11g' extending rearward from the radially inner end of the first intermediate wall portion 11c'.

The arrangement of the first to third clutches CL1-CL3, and the second brake BR2, and the configuration of the hydraulic pressure supply passages a, b, and c respectively supplying the hydraulic pressure chambers P1, P2, and P3 of the first, second, and third clutches CL1, CL2, and CL3 with a hydraulic pressure from the transmission case 11 are the same as those in the automatic transmission 30.

Accordingly, in the automatic transmission 40, the hydraulic pressure supply passages a, b, and c are also simplified. On top of that, the cylindrical structure 15' is comprised of the first and third carriers C1 and C3 and the output gear 13'. This allows stable support for the third carrier C3, pinion, and third ring gear R3 of the third gear set PG3 of the two-stage gear set PGt. Consequently, gear noise and a decrease in gear durability are reduced.

The present invention is not limited to the above embodiments, and replacement may be made without departing from the scope of the claims.

For example, in the above embodiments, the drive source A is disposed closer to the output gear 13 (13') (the right side of FIG. 1 and FIGS. 15-17). Alternatively, as shown by the phantom lines in FIG. 1 and FIGS. 15-17, a drive source A' may be disposed closer to the first to third clutches CL1-CL3 (the left side of FIG. 1 and FIGS. 15-17).

Also, in the above embodiments, the output gear 13 (13') is used as an output section coupled to the differential mechanism. Alternatively, the output section may be configured as a sprocket, and may be chain-coupled to the differential mechanism.

The foregoing embodiments are merely examples in nature, and are not intended to limit the scope of the present invention. The scope of the present invention should be defined by the following claims, and variations and modifications belonging to a range equivalent to the claims are all within the scope of the present invention.

INDUSTRIAL APPLICABILITY

The present invention is useful for an automatic transmission mounted in a vehicle, and is highly applicable to the industry, since the present invention provides an automatic transmission having a reduced length in the transmission axial direction, and stably supporting a carrier, pinion, and ring gear of the radially outer gear set of a two-stage planetary gear set.

DESCRIPTION OF REFERENCE CHARACTERS 10-40 Automatic Transmission
11 Transmission Case
11d Second Intermediate Wall Portion
11e Rear End Wall Portion
12 Input Shaft (Input Section)
13 Output Gear (Output Section)
14 Radially Outer Common Rotating Member
19A Radially Inner Rotating Member of Each of First-Third Clutches
19B Radially Outer Rotating Member of Each of First-Third Clutches
PG1 First Planetary Gear Set
PG2 Second Planetary Gear Set
PG3 Third Planetary Gear Set
PG4 Fourth Planetary Gear Set
PGt Two-Stage Planetary Gear Set
S1 First Sun Gear
S2 Second Sun Gear
S3 Third Sun Gear
S4 Fourth Sun Gear
R1 First Ring Gear
R2 Second Ring Gear
R3 Third Ring Gear
R4 Fourth Ring Gear
C1 First Carrier
C2 Second Carrier
C3 Third Carrier
C4 Fourth Carrier
CL1 First Clutch
CL2 Second Clutch
CL3 Third Clutch
BR1 First Brake
BR2 Second Brake
P1-P3 Hydraulic Pressure Chamber of Each of First-Third Clutches
a, b, c Hydraulic Pressure Supply Passage

The invention claimed is:

1. An automatic transmission mounted in a vehicle, the automatic transmission comprising:
    in a transmission case,
    an input section coupled to a drive source;
    an output section having a radially outer portion with teeth and a cylindrical radially inner portion disposed radially inward from the radially outer portion and extending in an axial direction of the automatic transmission;
    four planetary gear sets forming a plurality of power transmission paths from the input section to the output section; and
    five frictional engagement elements configured to select one of the plurality of the power transmission paths to switch among the power transmission paths,
    the input section, the output section, the planetary gear sets, and the five frictional engagement elements being coaxially arranged, wherein
    two of the four planetary gear sets are arranged such that one of the two planetary gear sets is disposed radially inward from the other to form a two-stage planetary gear set,
    one of the other two planetary gear sets functions as a specified planetary gear set disposed adjacent to the two-stage planetary gear set in the axial direction of the automatic transmission,
    a carrier of a radially outer planetary gear set of the two-stage planetary gear set, a carrier of the specified planetary gear set, and the output section are always engaged together,
    the carrier of the radially outer planetary gear set of the two-stage planetary gear set, the carrier of the specified planetary gear set, and the output section are engaged together and integrated together to form a cylindrical structure extending in the axial direction of the automatic transmission, and
    an inner peripheral surface of a front hollow disk member of the carrier of the radially outer planetary gear set of the two-stage planetary gear set is fitted to an outer peripheral surface of a rear hollow disk member of the carrier of the specified planetary gear set.

2. The automatic transmission of claim 1, wherein
    in the two-stage planetary gear set, a ring gear of a radially inner planetary gear set and a sun gear of the radially outer planetary gear set are integrated together.

3. The automatic transmission of claim 2, wherein
    the four planetary gear sets are first, second, third, and fourth planetary gear sets all of which are of a single-pinion type,
    the first planetary gear set includes a first sun gear, a first carrier, and a first ring gear,
    the second planetary gear set includes a second sun gear, a second carrier, and a second ring gear,
    the third planetary gear set includes a third sun gear, a third carrier, and a third ring gear,
    the fourth planetary gear set includes a fourth sun gear, a fourth carrier, and a fourth ring gear,
    the radially inner planetary gear set of the two-stage planetary gear set is the second planetary gear set,
    the radially outer planetary gear set of the two-stage planetary gear set is the third planetary gear set,
    the specified planetary gear set is the first planetary gear set,
    the input section and the second carrier are always engaged together,
    the first and second sun gears are always engaged together,
    the first ring gear and the fourth carrier are always engaged together,
    the second ring gear and the third sun gear are always engaged together,
    the output section and the first and third carriers are always engaged together, and
    the five frictional engagement elements are:
        a first clutch engaging and disengaging the input section and the second carrier with and from the fourth sun gear;
        a second clutch engaging and disengaging the second ring gear and the third sun gear with and from the fourth sun gear;
        a third clutch engaging and disengaging the third ring gear with and from the fourth sun gear;
        a first brake engaging and disengaging the first and second sun gears with and from the transmission case; and
        a second brake engaging and disengaging the fourth ring gear with and from the transmission case.

4. The automatic transmission of claim 3, wherein
    the automatic transmission provides eight forward gears and one reverse gear,
    the first clutch and the first and second brakes are engaged to provide a first gear, the second clutch and the first and second brakes are engaged to provide a second gear,
the first and second clutches and the second brake are engaged to provide a third gear,
the second and third clutches and the second brake are engaged to provide a fourth gear,
the first and third clutches and the second brake are engaged to provide a fifth gear,
the first, second, and third clutches are engaged to provide a sixth gear in which a gear reduction ratio of the automatic transmission is 1,
the first and third clutches and the first brake are engaged to provide a seventh gear,
the second and third clutches and the first brake are engaged to provide an eighth gear, and
the third clutch and the first and second brakes are engaged to provide a reverse gear.

5. The automatic transmission of claim 1, wherein
the four planetary gear sets are first, second, third, and fourth planetary gear sets all of which are of a single-pinion type,
the first planetary gear set includes a first sun gear, a first carrier, and a first ring gear,
the second planetary gear set includes a second sun gear, a second carrier, and a second ring gear,
the third planetary gear set includes a third sun gear, a third carrier, and a third ring gear,
the fourth planetary gear set includes a fourth sun gear, a fourth carrier, and a fourth ring gear,
the radially inner planetary gear set of the two-stage planetary gear set is the second planetary gear set,
the radially outer planetary gear set of the two-stage planetary gear set is the third planetary gear set,
the specified planetary gear set is the first planetary gear set,
the input section and the second carrier are always engaged together,
the first and second sun gears are always engaged together,
the first ring gear and the fourth carrier are always engaged together,
the second ring gear and the third sun gear are always engaged together,
the output section and the first and third carriers are always engaged together, and
the five frictional engagement elements are:
 a first clutch engaging and disengaging the input section and the second carrier with and from the fourth sun gear;
 a second clutch engaging and disengaging the second ring gear and the third sun gear with and from the fourth sun gear;
 a third clutch engaging and disengaging the third ring gear with and from the fourth sun gear;
 a first brake engaging and disengaging the first and second sun gears with and from the transmission case; and
 a second brake engaging and disengaging the fourth ring gear with and from the transmission case.

6. The automatic transmission of claim 5, wherein
the automatic transmission provides eight forward gears and one reverse gear,
the first clutch and the first and second brakes are engaged to provide a first gear,
the second clutch and the first and second brakes are engaged to provide a second gear,
the first and second clutches and the second brake are engaged to provide a third gear,
the second and third clutches and the second brake are engaged to provide a fourth gear,
the first and third clutches and the second brake are engaged to provide a fifth gear,
the first, second, and third clutches are engaged to provide a sixth gear in which a gear reduction ratio of the automatic transmission is 1,
the first and third clutches and the first brake are engaged to provide a seventh gear,
the second and third clutches and the first brake are engaged to provide an eighth gear, and
the third clutch and the first and second brakes are engaged to provide a reverse gear.

7. An automatic transmission mounted in a vehicle, the automatic transmission comprising:
 in a transmission case,
 an input section coupled to a drive source;
 an output section having a radially outer portion with teeth and a cylindrical radially inner portion disposed radially inward from the radially outer portion and extending in an axial direction of the automatic transmission;
 four planetary gear sets forming a plurality of power transmission paths from the input section to the output section; and
 five frictional engagement elements configured to select one of the plurality of the power transmission paths to switch among the power transmission paths,
 the input section, the output section, the planetary gear sets, and the five frictional engagement elements being coaxially arranged, wherein
 two of the four planetary gear sets are arranged such that one of the two planetary gear sets is disposed radially inward from the other to form a two-stage planetary gear set,
 one of the other two planetary gear sets functions as a specified planetary gear set disposed adjacent to the two-stage planetary gear set in the axial direction of the automatic transmission,
 a carrier of a radially outer planetary gear set of the two-stage planetary gear set, a carrier of the specified planetary gear set, and the output section are always engaged together,
 the carrier of the radially outer planetary gear set of the two-stage planetary gear set, the carrier of the specified planetary gear set, and the output section are engaged together and integrated together to form a cylindrical structure extending in the axial direction of the automatic transmission,
 the five frictional engagement elements include three clutches each having a radially inner rotating member and a radially outer rotating member, and each engaging and disengaging the associated radially inner rotating member with and from the associated radially outer rotating member in accordance with supply and release of a hydraulic pressure, and
 the radially outer rotating members of the three clutches are integrated together to function as a radially outer common rotating member shared by the three clutches.

8. The automatic transmission of claim 7, wherein
the three clutches are arranged in the transmission case adjacent to an end wall portion provided at an axial end portion of the transmission case such that one of the clutches is disposed inwardly from an other of the clutches in a radial direction perpendicular to the axial direction, and the other of the clutches is disposed inwardly from still an other of the clutches in the radial direction, and hydraulic pressure supply passages from the transmission case to the respective clutches are provided so as to communicate with hydraulic pressure chambers of the respective clutches from the end wall portion of the transmission case through the radially outer common rotating member.

9. The automatic transmission of claim 8, wherein the four planetary gear sets are first, second, third, and fourth planetary gear sets all of which are of a single-pinion type, the first planetary gear set includes a first sun gear, a first carrier, and a first ring gear, the second planetary gear set includes a second sun gear, a second carrier, and a second ring gear, the third planetary gear set includes a third sun gear, a third carrier, and a third ring gear, the fourth planetary gear set includes a fourth sun gear, a fourth carrier, and a fourth ring gear, the radially inner planetary gear set of the two-stage planetary gear set is the second planetary gear set, the radially outer planetary gear set of the two-stage planetary gear set is the third planetary gear set, the specified planetary gear set is the first planetary gear set, the input section and the second carrier are always engaged together, the first and second sun gears are always engaged together, the first ring gear and the fourth carrier are always engaged together, the second ring gear and the third sun gear are always engaged together, the output section and the first and third carriers are always engaged together, and the five frictional engagement elements are:
  a first clutch engaging and disengaging the input section and the second carrier with and from the fourth sun gear;
  a second clutch engaging and disengaging the second ring gear and the third sun gear with and from the fourth sun gear;
  a third clutch engaging and disengaging the third ring gear with and from the fourth sun gear;
  a first brake engaging and disengaging the first and second sun gears with and from the transmission case; and
  a second brake engaging and disengaging the fourth ring gear with and from the transmission case.

10. The automatic transmission of claim 9, wherein the automatic transmission provides eight forward gears and one reverse gear, the first clutch and the first and second brakes are engaged to provide a first gear, the second clutch and the first and second brakes are engaged to provide a second gear, the first and second clutches and the second brake are engaged to provide a third gear, the second and third clutches and the second brake are engaged to provide a fourth gear, the first and third clutches and the second brake are engaged to provide a fifth gear, the first, second, and third clutches are engaged to provide a sixth gear in which a gear reduction ratio of the automatic transmission is 1, the first and third clutches and the first brake are engaged to provide a seventh gear, the second and third clutches and the first brake are engaged to provide an eighth gear, and the third clutch and the first and second brakes are engaged to provide a reverse gear.

11. The automatic transmission of claim 7, wherein the transmission case includes an intermediate wall portion provided at an intermediate position in the axial direction and extending in a radial direction perpendicular to the axial direction, the three clutches are arranged in the transmission case adjacent to the intermediate wall portion such that one of the clutches is disposed inwardly from an other of the clutches in a radial direction perpendicular to the axial direction, and the other of the clutches is disposed inwardly from still an other of the clutches in the radial direction, and hydraulic pressure supply passages from the transmission case to the respective clutches are provided so as to communicate with hydraulic pressure chambers of the respective clutches from the intermediate wall portion of the transmission case through the radially outer common rotating member.

12. The automatic transmission of claim 11, wherein the four planetary gear sets are first, second, third, and fourth planetary gear sets all of which are of a single-pinion type, the first planetary gear set includes a first sun gear, a first carrier, and a first ring gear, the second planetary gear set includes a second sun gear, a second carrier, and a second ring gear, the third planetary gear set includes a third sun gear, a third carrier, and a third ring gear, the fourth planetary gear set includes a fourth sun gear, a fourth carrier, and a fourth ring gear, the radially inner planetary gear set of the two-stage planetary gear set is the second planetary gear set, the radially outer planetary gear set of the two-stage planetary gear set is the third planetary gear set, the specified planetary gear set is the first planetary gear set, the input section and the second carrier are always engaged together, the first and second sun gears are always engaged together, the first ring gear and the fourth carrier are always engaged together, the second ring gear and the third sun gear are always engaged together, the output section and the first and third carriers are always engaged together, and the five frictional engagement elements are:
  a first clutch engaging and disengaging the input section and the second carrier with and from the fourth sun gear;
  a second clutch engaging and disengaging the second ring gear and the third sun gear with and from the fourth sun gear;
  a third clutch engaging and disengaging the third ring gear with and from the fourth sun gear;
  a first brake engaging and disengaging the first and second sun gears with and from the transmission case; and
  a second brake engaging and disengaging the fourth ring gear with and from the transmission case.

13. The automatic transmission of claim 12, wherein
the automatic transmission provides eight forward gears and one reverse gear,
the first clutch and the first and second brakes are engaged to provide a first gear,
the second clutch and the first and second brakes are engaged to provide a second gear,
the first and second clutches and the second brake are engaged to provide a third gear,
the second and third clutches and the second brake are engaged to provide a fourth gear,
the first and third clutches and the second brake are engaged to provide a fifth gear,
the first, second, and third clutches are engaged to provide a sixth gear in which a gear reduction ratio of the automatic transmission is 1,
the first and third clutches and the first brake are engaged to provide a seventh gear,
the second and third clutches and the first brake are engaged to provide an eighth gear, and
the third clutch and the first and second brakes are engaged to provide a reverse gear.

14. The automatic transmission of claim 7, wherein
the four planetary gear sets are first, second, third, and fourth planetary gear sets all of which are of a single-pinion type,
the first planetary gear set includes a first sun gear, a first carrier, and a first ring gear,
the second planetary gear set includes a second sun gear, a second carrier, and a second ring gear,
the third planetary gear set includes a third sun gear, a third carrier, and a third ring gear,
the fourth planetary gear set includes a fourth sun gear, a fourth carrier, and a fourth ring gear,
the radially inner planetary gear set of the two-stage planetary gear set is the second planetary gear set,
the radially outer planetary gear set of the two-stage planetary gear set is the third planetary gear set,
the specified planetary gear set is the first planetary gear set,
the input section and the second carrier are always engaged together,
the first and second sun gears are always engaged together,
the first ring gear and the fourth carrier are always engaged together,
the second ring gear and the third sun gear are always engaged together,
the output section and the first and third carriers are always engaged together, and
the five frictional engagement elements are:
  a first clutch engaging and disengaging the input section and the second carrier with and from the fourth sun gear;
  a second clutch engaging and disengaging the second ring gear and the third sun gear with and from the fourth sun gear;
  a third clutch engaging and disengaging the third ring gear with and from the fourth sun gear;
  a first brake engaging and disengaging the first and second sun gears with and from the transmission case; and
  a second brake engaging and disengaging the fourth ring gear with and from the transmission case.

15. The automatic transmission of claim 14, wherein
the automatic transmission provides eight forward gears and one reverse gear,
the first clutch and the first and second brakes are engaged to provide a first gear,
the second clutch and the first and second brakes are engaged to provide a second gear,
the first and second clutches and the second brake are engaged to provide a third gear,
the second and third clutches and the second brake are engaged to provide a fourth gear,
the first and third clutches and the second brake are engaged to provide a fifth gear,
the first, second, and third clutches are engaged to provide a sixth gear in which a gear reduction ratio of the automatic transmission is 1,
the first and third clutches and the first brake are engaged to provide a seventh gear,
the second and third clutches and the first brake are engaged to provide an eighth gear, and
the third clutch and the first and second brakes are engaged to provide a reverse gear.

16. An automatic transmission mounted in a vehicle, the automatic transmission comprising:
in a transmission case,
an input section coupled to a drive source;
an output section having a radially outer portion with teeth and a cylindrical radially inner portion disposed radially inward from the radially outer portion and extending in an axial direction of the automatic transmission;
four planetary gear sets forming a plurality of power transmission paths from the input section to the output section; and
five frictional engagement elements configured to select one of the plurality of the power transmission paths to switch among the power transmission paths,
the input section, the output section, the planetary gear sets, and the five frictional engagement elements being coaxially arranged, wherein
two of the four planetary gear sets are arranged such that one of the two planetary gear sets is disposed radially inward from the other to form a two-stage planetary gear set,
one of the other two planetary gear sets functions as a specified planetary gear set disposed adjacent to the two-stage planetary gear set in the axial direction of the automatic transmission,
a carrier of a radially outer planetary gear set of the two-stage planetary gear set, a carrier of the specified planetary gear set, and the output section are always engaged together,
the carrier of the radially outer planetary gear set of the two-stage planetary gear set, the carrier of the specified planetary gear set, and the output section are engaged together and integrated together to form a cylindrical structure extending in the axial direction of the automatic transmission, and
the cylindrical structure is rotatably supported by the transmission case between the output section and the carrier of the specified planetary gear set.

17. The automatic transmission of claim 16, wherein
an outer surface of the cylindrical structure is rotatably supported by the transmission case through a bearing.

* * * * *